(12) United States Patent
Kato et al.

(10) Patent No.: US 7,815,426 B2
(45) Date of Patent: Oct. 19, 2010

(54) APPARATUS FOR FORMING ULTRAFINE PARTICLES

(75) Inventors: Hiroyuki Kato, Yokohama (JP); Isao Umeda, Yokohama (JP); Tsuyoshi Asahi, Osaka (JP); Hiroshi Masuhara, Osaka (JP); Teruki Sugiyama, Kobe (JP); Isamu Oh, Osaka (JP); Sen-ichi Ryo, Osaka (JP); Kazuya Hirata, Kawasaki (JP); Motohiko Nohmi, Yokohama (JP)

(73) Assignee: ABsize Inc., Sakai-shi (JP)

( * ) Notice: Subject to any disclaimer, the term of this patent is extended or adjusted under 35 U.S.C. 154(b) by 615 days.

(21) Appl. No.: 11/748,842

(22) Filed: May 15, 2007

(65) Prior Publication Data

US 2007/0284769 A1 Dec. 13, 2007

(30) Foreign Application Priority Data

May 15, 2006 (JP) ............................. 2006-135711

(51) Int. Cl.
*A61K 9/16* (2006.01)
*B02C 19/18* (2006.01)

(52) U.S. Cl. ..................... 425/174.4; 264/482; 977/901

(58) Field of Classification Search .............. 425/174.4; 264/5, 6, 482; 241/1, 21, 301; 977/901
See application file for complete search history.

(56) References Cited

U.S. PATENT DOCUMENTS

| | | | | |
|---|---|---|---|---|
| 2003/0201022 A1* | 10/2003 | Kawai et al. | ................ | 137/828 |
| 2004/0067167 A1* | 4/2004 | Zhang et al. | ............. | 422/82.05 |
| 2004/0072278 A1* | 4/2004 | Chou et al. | .................... | 435/29 |
| 2004/0115838 A1* | 6/2004 | Quake et al. | ................. | 436/538 |
| 2005/0066812 A1* | 3/2005 | Vesper et al. | ................... | 95/46 |
| 2005/0129580 A1* | 6/2005 | Swinehart et al. | ........... | 422/100 |
| 2005/0207940 A1* | 9/2005 | Butler et al. | .................. | 422/73 |
| 2005/0250199 A1* | 11/2005 | Anderson et al. | ........ | 435/287.2 |
| 2006/0103060 A1* | 5/2006 | Kawakami et al. | .......... | 266/202 |
| 2006/0121555 A1* | 6/2006 | Lean et al. | .................... | 435/30 |

(Continued)

FOREIGN PATENT DOCUMENTS

EP 1 351 666 10/2003

(Continued)

OTHER PUBLICATIONS

Yoshiaki Tamaki, et al., Tailoring nanoparticles of aromatic and dye molecules by excimer laser irradiation, Applied Surface Science, vol. 168, 2000, pp. 85-88.

(Continued)

*Primary Examiner*—Yogendra N Gupta
*Assistant Examiner*—Emmanuel S Luk
(74) *Attorney, Agent, or Firm*—Oblon, Spivak, McClelland, Maier & Neustadt, L.L.P.

(57) ABSTRACT

An apparatus for forming ultrafine particles, including: a light source generating a laser beam to be irradiated at an organic substance; at least one microflow channel capable of passing therethrough a suspension containing the organic substance; and a flow device for allowing the suspension containing the organic substance to continuously or intermittently pass through the microflow channel, the organic substance present in the microflow channel being irradiated with the laser beam at least once within a predetermined period, thereby forming ultrafine particles of the organic substance.

25 Claims, 11 Drawing Sheets

U.S. PATENT DOCUMENTS

| | | | |
|---|---|---|---|
| 2006/0231136 A1* | 10/2006 | Kawai et al. | 137/1 |
| 2006/0251584 A1* | 11/2006 | Nagare et al. | 424/46 |
| 2006/0257489 A1* | 11/2006 | Kawakami et al. | 424/489 |
| 2007/0114306 A1 | 5/2007 | Kawakami et al. | |
| 2007/0298109 A1* | 12/2007 | Kricka et al. | 424/489 |

FOREIGN PATENT DOCUMENTS

| | | |
|---|---|---|
| JP | 2001-113159 | 4/2001 |
| JP | 2004-89890 | 3/2004 |
| JP | 2004-167316 | 6/2004 |
| JP | 2004-520157 | 7/2004 |
| JP | 2004-267918 | 9/2004 |
| JP | 2005-8524 | 1/2005 |
| JP | 2005-125204 | 5/2005 |
| JP | 2005-125258 | 5/2005 |
| JP | 2005-169386 | 6/2005 |
| JP | 2005-177596 | 7/2005 |
| JP | 2005-238124 | 9/2005 |
| JP | 2005-238342 | 9/2005 |
| JP | 2005-279328 | 10/2005 |
| JP | 2005-334782 | 12/2005 |
| JP | 2006-26503 | 2/2006 |
| JP | 2007-45674 | 2/2007 |
| WO | WO 02/056866 A1 | 7/2002 |
| WO | WO 2005/049213 A1 | 6/2005 |
| WO | WO 2005/082521 A1 | 9/2005 |
| WO | WO 2005/092489 A1 | 10/2005 |

OTHER PUBLICATIONS

Bo Li, et al., "Enhancement of organic nanoparticle preparation by laser ablation in aqueous solution using surfactants", Applied Surface Science, vol. 210, 2003, pp. 171-176.

Sanshiro Nagare, et al., "Indomethacin nanoparticles directly deposited on the fluidized particulate excipient by pulsed laser deposition", Journal of Nonoparticle Research, 2004, pp. 589-593.

S. Nagare, et al., "Reagglomeration mechanism of drug nanoparticles by pulsed laser deposition", Solid State Ionics, vol. 172, 2004, pp. 243-247.

Takehiko Kitamori, et al., "Technology of Microchemical chip and the application thereof" the 1st edition, Maruzen, 2004, 2 front pages, pp. 51-52, and p. 299, (with partial English translation).

Hang Lu, et al., "Photochemical reactions and on-line UV detection in microfabricated reactors", Lab on a Chip, 2001, vol. 1, pp. 22-28.

* cited by examiner

APPARATUS FOR FORMING ULTRAFINE PARTICLES

BACKGROUND OF THE INVENTION

1. Field of the Invention

The present invention is related to an apparatus for irradiating a drug with a laser beam to form ultrafine particles.

Priority is claimed on Japanese Patent Application No. 2006-135711, filed May 15, 2006, the content of which is incorporated herein by reference.

2. Description of Related Art

Some organic compounds used for medical drugs, such as anti-cancer drugs, are insoluble in water, so that they are difficult for cells to absorb. For improving the intake of the water-insoluble medical drugs by cells, it was necessary to reduce the size of the drugs to ultrafine particles which can pass through the cell membrane of the affected part. The size of ultrafine particles which can pass through a cell membrane is considered to be from 50 to 200 nm, and various apparatuses for forming such ultrafine particles have been conventionally proposed. For example, a pulverizing apparatus called a "wet ball mill" has been known. This apparatus is a cylindrical vessel having a multitude of balls made of a metal, a ceramic or a plastic accommodated therein together with a rotor having a rim ring, and is capable of pulverizing drugs by the rolling friction of the balls and the rotor.

Further, a method for forming ultrafine particles of an organic compound is known in which short pulsed laser beams of nano seconds or femto seconds are used (for example, see Japanese Unexamined Patent Application, First Publication No. 2005-238342). In this method, drugs suspended in water within a transparent vessel are externally irradiated with a pulsed laser to thereby pulverize the drugs in water.

SUMMARY OF THE INVENTION

However, the size limit to which the drugs could be reduced by the above-mentioned apparatus was 200 nm. Therefore, satisfactorily size-reduced ultrafine particles could not be obtained. Further, there were problems in that the balls or the material for the rotor got mixed with the drug; that elevation of temperature by frictional heat caused deterioration of the drugs; that ultrafine particles got agglomerated so that the drugs could not be reduced to a desired size; and that the size of the ultrafine particles formed was heterogeneous.

Further, in the method in which a drug is irradiated with a pulsed laser, the treatment of the drugs was performed for each vessel what is called a "batchwise" manner. That is, in this method, the drug is irradiated with a laser beam in a state of suspension in an aqueous solution while stirring. Therefore, irradiation conditions were difficult to control, so that ultrafine particles of drugs could not be formed homogenously without deterioration at an industrial scale. In addition, this method was inappropriate for continuous, mass production of ultrafine particles.

The present invention has been achieved taking the above circumstances into consideration, with an object of providing an apparatus for continuously forming ultrafine particles having a substantially homogeneous size in a mass.

In the present invention, for achieving the above-mentioned object, a suspension containing an organic substance is passed through a microflow channel, and the organic substance is irradiated with a laser beam.

More specifically, the apparatus for forming ultrafine particles according to the present invention includes: a light source generating a laser beam to be irradiated at an organic substance; at least one microflow channel capable of passing therethrough a suspension containing the organic substance; and a flow device for allowing the suspension containing the organic substance to continuously or intermittently pass through the microflow channel, the organic substance present in the microflow channel being irradiated with the laser beam at least once within a predetermined period, thereby forming ultrafine particles of the organic substance.

The apparatus for forming ultrafine particles according to the present invention includes a laser source, at least one microflow channel and a flow device.

The laser source generates a pulsed laser beam having an intensity which is equal to or higher than a predetermined intensity.

The apparatus includes at least one microflow channel. The microflow channel is capable of passing therethrough a suspension containing the organic substance. The suspension need not actually be flowing, as long as it can be allowed to pass through the microflow channel.

The flow device is capable of allowing the suspension to pass through the microflow channel. The flow of the suspension includes a continuous manner and an intermittent manner. In the continuous manner, the suspension is controlled by the flow device so as to continuously flow through the microflow channel. A case where the flow of the suspension is controlled by such a flow device is regarded as a continuous manner, even if the suspension is not actually flowing. On the other hand, in the intermittent manner, the flow of the suspension is controlled by the flow device, so as to alternately repeat the stationary state and the flowing state. A case where the flow of the suspension is controlled by such a flow device is regarded as a intermittent manner, even if the flow of the suspension is not actually stopped.

The organic substance present in the microflow channel is irradiated with a laser beam generated from the light source. It is satisfactory that the organic substance is irradiated with the laser beam at least once within a predetermined period. When a continuous laser beam is used, a shutter or the like may be used to generate an irradiated state and an unirradiated state, so that the irradiated state is generated at least once within a predetermined period. On the other hand, an intermittent laser beam has an on-state and an off-state. When an intermittent laser beam is used, it is satisfactory that the on-state is generated at least once within a predetermined period.

In the manner as described above, the laser irradiated to the organic substance can be controlled to the amount required for forming ultrafine particles of the organic substance, so as to render the size of the ultrafine particles substantially uniform. Further, since the organic substance is allowed to flow, the organic substance can be consecutively irradiated with a laser, so that the efficiency of the size-reducing treatment (formation of ultrafine particles) can be enhanced, and ultrafine particles of the organic substance can be continuously formed in a large amount.

In the apparatus for forming ultrafine particles according to the present invention, it is preferable that the flow device allow the suspension containing the organic substance to continuously pass through the microflow channel, that the laser beam is a pulsed laser beam, and that the organic substance is irradiated with the pulsed laser beam at least once.

By using a pulsed laser beam, the number of irradiation of the organic substance with a laser beam can be easily controlled. Further, by allowing the suspension to flow continuously, the efficiency of the size-reducing treatment (formation of ultrafine particles) can be enhanced, and ultrafine particles of the organic substance can be continuously formed in a large amount.

In the apparatus for forming ultrafine particles according to the present invention, it is preferable that the organic substance be a particulate, insoluble organic drug having an average diameter of 1 to 500 μm, and that the above-mentioned suspension is a suspension of the particulate, insoluble organic drug in an aqueous solution, an organic solvent or an oily liquid.

In the apparatus for forming ultrafine particles according to the present invention, it is preferable that the ultrafine particles of the organic substance have an average diameter of 10 to 500 nm, more preferably 10 to 100 nm.

In the apparatus for forming ultrafine particles according to the present invention, it is preferable that the portion of the microflow channel to be irradiated with the laser beam be even.

By making the portion to be irradiated even, the laser beam can be accurately irradiated onto the organic substance, so that the size-reducing treatment (formation of ultrafine particles) can be efficiently performed.

In the apparatus for forming ultrafine particles according to the present invention, it is preferable that the pulsed laser beam have an excitation light intensity of 1 to 1,000 mJ/cm$^2$, more preferably 30 to 300 mJ/cm$^2$.

In the apparatus for forming ultrafine particles according to the present invention, it is preferable that the pulsed laser beam have a pulse width of 10 femto seconds to 1 micro seconds, more preferably 10 femto seconds to 100 nano seconds.

In the apparatus for forming ultrafine particles according to the present invention, it is preferable that the liquid of the suspension be an inert or semi-inert liquid.

By using an inert or semi-inert liquid, the liquid can be vaporized immediately after the size reduction of the organic substance (formation of ultrafine particles of the organic substance), so that the ultrafine particles of the organic substance can be easily collected. Further, by using an inert or semi-inert liquid, the temperature elevation by irradiation of laser beam can be suppressed, so that deterioration of the organic substance by the temperature elevation can be prevented.

In the apparatus for forming ultrafine particles according to the present invention, it is preferable that the maximum diameter of the cross-section of the microflow channel be 1.1 to 200 times larger than the diameter of the organic substance, more advantageously 3 to 60 times larger than the diameter of the organic substance.

By setting the maximum diameter of the cross-section of the microflow channel within the above-mentioned range, the flow of the organic substance within the microflow channel can be smoothed, so that clogging of the microflow channel by the organic substance can be avoided, and the laser beam can be accurately irradiated to the organic substance.

In the apparatus for forming ultrafine particles according to the present invention, it is preferable that the flow rate VL of the organic substance passing through the microflow channel satisfy the relation: $VL < K \times dL/tL$, wherein dL represents the diameter of the irradiation region of the laser beam upon irradiation thereof, tL represents the irradiation period, and K represents a predetermined constant.

By setting the flow rate of the organic substance within the above-mentioned range, the organic substance can be irradiated with the laser beam without any excess or deficiency of irradiation, so that the organic substance can be reduced to a desired size. For example, when the organic substance is irradiated intermittently with a laser beam, the irradiation can be performed an appropriate number of times.

It is preferable that the apparatus for forming ultrafine particles according to the present invention further include a microflow-channel introductory part communicating with the microflow channel and introducing the suspension to the microflow channel, and that the cross-sectional area of the microflow-channel introductory part is larger than that of the microflow channel.

The organic substance passing through the microflow channel tends to exhibit a flow rate distribution such that the flow becomes slowest near the walls of the microflow channel and fastest near the center line of the microflow channel. By making the cross-sectional area of the microflow-channel introductory part larger than that of the microflow channel, the flow rate distribution can be rendered substantially uniform. Thus, the laser beam can be uniformly irradiated onto the organic substance, regardless of the position of the organic substance passing through the microflow channel.

It is preferable that the apparatus for forming ultrafine particles according to the present invention further include a transition part disposed between the microflow-channel introductory part and the microflow channel. The transition part communicates with both of the microflow-channel introductory part and the microflow channel and introduces the suspension from the microflow-channel introductory part to the microflow channel. Further, it is preferable that the distance from the microflow-channel introductory part to the microflow channel be not larger than 10 times the hydraulic diameter of the cross-section of the microflow channel.

By providing a transition part, the flow rate distribution can be rendered closer to uniform.

It is preferable that the apparatus for forming ultrafine particles according to the present invention have a plurality of the microflow channels, and that the plurality of microflow channels is arranged in parallel.

By providing a plurality of microflow channels, the number of microflow channels to be irradiated with the laser beam can be increased, so that the amount of the organic substance to be size-reduced can be increased.

It is preferable that the apparatus for forming ultrafine particles according to the present invention further include an agglomeration prevention unit for preventing agglomeration of the organic substance following the irradiation with the laser beam.

By using an agglomeration prevention unit, agglomeration of the ultrafine particles of the organic substance can be prevented, so that the ultrafine particles formed can be reliably collected. As the agglomeration prevention unit, it is preferable to use a unit which prevents agglomeration by applying ultrasonic waves to the suspension, or a unit which stirs the suspension with an impeller.

It is preferable that the apparatus for forming ultrafine particles according to the present invention further include a cyclone separator for sorting the organic substance following the irradiation with the laser beam into ultrafine particles and particles which have not been size-reduced.

By using a cyclone separator, particles of the organic substance which have not been size-reduced even after the irradiation with the laser beam can be separated, so that ultrafine particles of the organic substance having a substantially uniform size can be collected.

In the apparatus for forming ultrafine particles according to the present invention, it is preferable that the microflow channel be provided with a temperature-control unit for controlling the temperature of said suspension.

By providing a temperature-control unit, it becomes possible to prevent the deterioration of the organic substance caused by the temperature elevation of the organic substance following the irradiation of the laser beam.

In the apparatus for forming ultrafine particles according to the present invention, it is preferable that the microflow channel have a hydrophobic or hydrophilic opening on an inflow end portion thereof for preventing bubbles within the suspension from flowing into the microflow channel, and that the inflow end portion is provided with a discharge channel for discharging the bubbles.

When the microflow channel has a hydrophobic or hydrophilic opening on an inflow end portion thereof, bubbles within the suspension can be prevented from flowing into the microflow channel, so that the laser beam can be reliably irradiated to the organic substance, and the efficiency of forming ultrafine particles can be enhanced.

In the apparatus for forming ultrafine particles according to the present invention, it is preferable that the microflow channel have provided in a wall thereof a flow rate-increasing part for increasing the flow rate of the suspension.

When the microflow channel has provided, in a wall thereof, a flow rate-increasing part for increasing the flow rate of the suspension, the flow rate of the organic substance flowing near the wall of the microflow channel can be increased, so that the laser beam can be irradiated to the organic substance while rendering the flow rate distribution substantially uniform. Thus, heterogeneity in the size of the ultrafine particles of the organic substance can be prevented from occurring.

In the apparatus for forming ultrafine particles according to the present invention, it is preferable that the microflow channel have an arc portion in which at least one portion thereof is in the shape of an arc and which allows the suspension to pass along the arc. Further, it is preferable that the apparatus be provided with a mobile, laser beam-irradiation unit for irradiating the laser beam along the arc portion of the microflow channel.

In such a case, the position to be irradiated with the laser beam can be changed sequentially, so that the efficiency of the treatment can be enhanced and ultrafine particles of the organic substance can be formed in large amounts.

According to the present invention, ultrafine particles having substantially the same size can be formed in a large amount.

REFERENCE NUMERALS

10 Light source
40 Pump (flow device)
50, 150 Microflow-channel introductory part
60, 160, 260, 460, 560 Microflow channel
64 Transition part
100 Apparatus for forming ultrafine particles

PREFERRED EMBODIMENTS OF THE PRESENT INVENTION

Hereinbelow, the preferred embodiments of the present invention will be described with reference to the drawings.

First Embodiment

Figure 1:
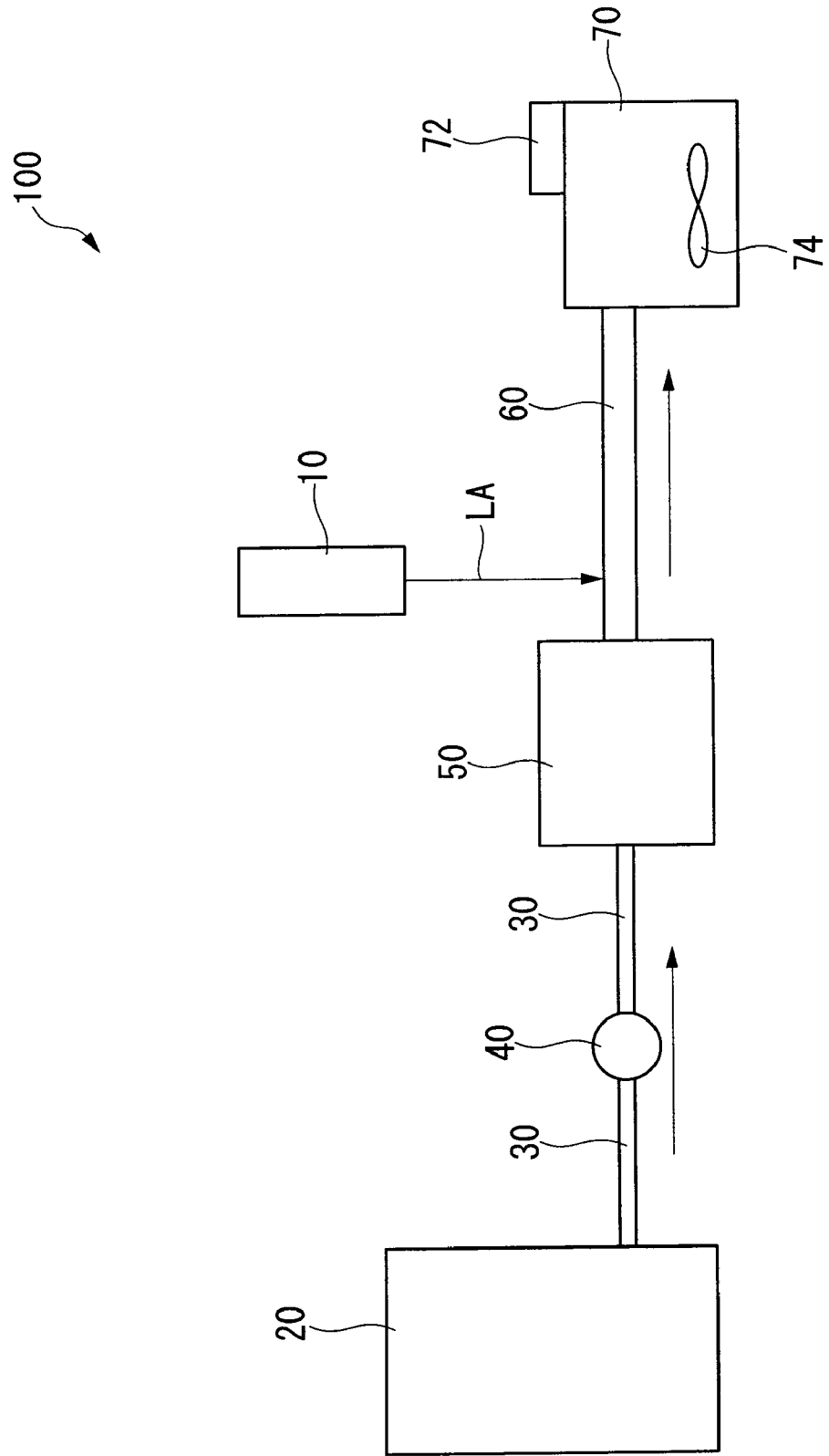
FIG. 1 is a schematic diagram showing the apparatus 100 for forming ultrafine particles according to the present invention.

FIG. 1 is a schematic diagram showing the apparatus 100 for forming ultrafine particles according to the present invention. The apparatus 100 includes a light source system and a flow channel system. The light source system includes a light source 10. The flow channel system includes a supply part 20, a pump 40, a microflow-channel introductory part 50, a microflow channel 60 and a collecting part 70.

<<Optical System>>
<Light Source 10>

A laser beam is generated from the light source 10. The light source is mounted on a base (not shown), so that the laser beam generated from the light source 10 is irradiated toward the microflow channel 60 described below.

By irradiating the laser beam generated from the light source 10 to the organic substance mixed within a solvent, a temperature difference is rapidly generated at the inner portions of the organic substance. This temperature difference generates an internal stress which breaks the organic substance, thereby forming ultrafine particles of the organic substance. The mechanism of the formation of ultrafine particles will be described below in detail.

The wavelength of the laser beam generated from the light source 10 may be selected depending on the absorption wavelength of the organic substance to be size-reduced, or on the wavelength of multiphoton absorption. Examples of the laser beam include an ultraviolet laser beam, a visible laser beam, a near-infrared laser beam or an infrared laser beam.

Examples of ultraviolet laser beams include excimer lasers (193 nm, 248 nm, 308 nm, 351 nm), a nitrogen laser (337 nm), and the third and fourth harmonics of a YAG laser (355 nm, 266 nm). Examples of visible laser beams include the second harmonic of a YAG laser (532 nm), an Ar ion laser (488 nm or 514 nm), and dye lasers. Examples of near-infrared lasers include various semiconductor lasers, a titanium-sapphire laser, a YAG laser and a glass laser. Further, by using any of the above-exemplified lasers with an optical parametric oscillator, a light ray having a desired wavelength within the range of ultraviolet to infrared may be oscillated.

<Pulse Width and Intensity of Laser Beam>

Figure 2:
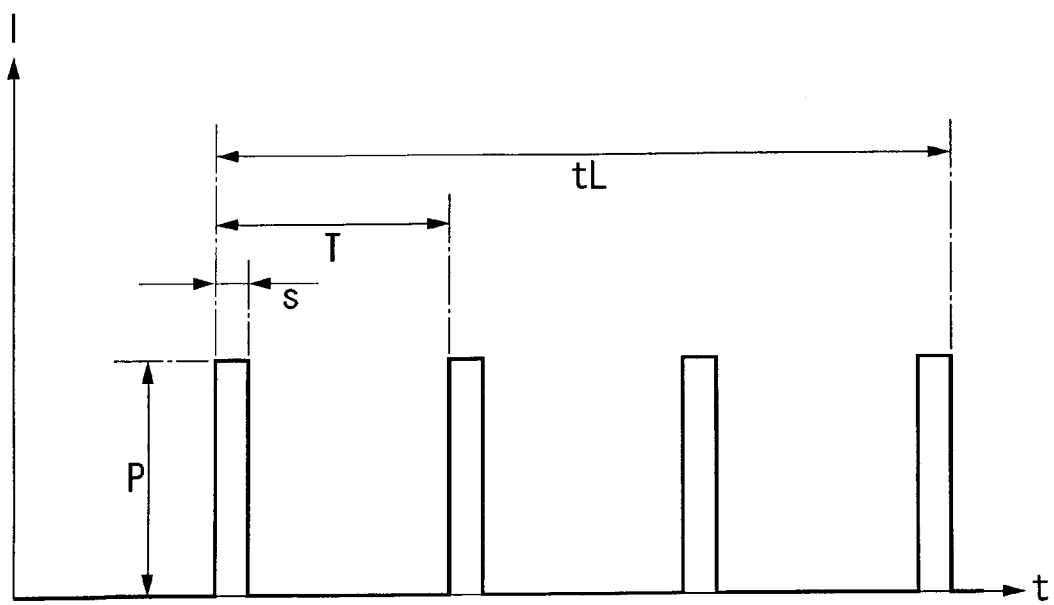
FIG. 2 is a graph showing the pulse width and intensity of the laser beam generated from the light source 10.

The laser beam generated from the light source 10 is preferably a pulsed laser beam. FIG. 2 is a graph showing the pulse width and intensity of the laser beam generated from the light source 10. In the graph shown in FIG. 2, the horizontal axis indicates time, and the vertical axis indicates the excitation light intensity of the laser beam generated from the light source 10.

As shown in FIG. 2, the laser beam generated from the light source 10 is a pulsed laser beam. That is, the light source 10 generates a laser beam intermittently, so as to alternately repeat an on-state in which a laser beam is generated and an off-state in which a laser beam is not generated. It is particularly desirable to use a laser beam in which the intensity changes in a pulsewise manner. Hereafter, one pulse of a laser beam is referred to as a "pulsed beam". When a pulsed laser beam is used, one pulsed beam effects one irradiation.

The excitation light intensity P of the laser beam generated from the light source 10 is preferably from 1 to 1,000 mJ/cm². Further, the pulse period T between a pulsed beam and a subsequent pulsed beam (adjacent pulsed beams) is preferably from 0.1 to 1,000 Hz. Here, a "pulse period" means the period from the start of a pulsed beam to the start of a subsequent (adjacent) pulsed beam, or the period from the end of a pulsed beam to the end of a subsequent (adjacent) pulsed beam. Furthermore, the pulse width s of respective pulsed beams is preferably from 10 femto seconds to 1 micro seconds. Here, a "pulse width" means the period from the start of a pulsed beam to the end of the pulsed beam.

When a pulsed laser beam is used, one irradiation of the organic substance is effected by one pulsed beam. In the present specification, the period during which a laser beam can be irradiated to a target organic substance is referred to as "irradiation period tL". As shown in FIG. 2, when the irradiation period tL is long, it includes both of the on- and off-states of the pulsed laser beam. In the off-state, no laser beam is generated, whereas in the on-state, a laser beam is generated and irradiated to a target organic substance. Thus, even when a certain period includes an off-state, that period is regarded as the irradiation period tL if it also includes an on-state in which a laser beam can be irradiated to a target organic substance.

More specifically, in a case where a target organic substance is allowed to gradually flow, so that the organic substance flowing comes into the irradiation region of the laser beam, and then comes out of the irradiation region, when the organic substance is present in the irradiation region for a long period, the organic substance gets irradiated with a pulsed beam a plurality of times. That is, when the organic substance is allowed to gradually flow, the above-mentioned irradiation period tL is regarded as the period during which the target organic substance is present in the irradiation region of the laser beam. As described above, ultrafine particles of the organic substance can be formed by irradiating the organic substance with a laser beam. For obtaining ultrafine particles having a desired size, the number of irradiations of the organic substance with a pulsed beam can be determined. The number of irradiations with a pulsed beam can be changed by adjusting the above-mentioned pulse period T, the flow rate of the organic substance, etc. Thus, in the irradiation region of the laser beam, the organic substance is irradiated with a pulsed beam at least once. The irradiation region of the laser beam is the region where the laser beam is irradiated during the on-state. Further, the above-mentioned irradiation period tL corresponds to the "predetermined period".

As described above, with respect to the irradiation period, it is preferable that a pulsed beam of a short period of 10 femto seconds to 1 micro seconds be irradiated a plurality of times. Further, by changing the above-mentioned pulse width s, the particle diameter of the ultrafine particles of the organic substance can be controlled.

<<Flow Channel System>>

<Supply Part 20>

As shown in FIG. 1, the supply part 20 is a vessel for storing a suspension of an organic substance which is a solvent having the organic substance mixed therein.

As the solvent in which the organic solvent is mixed, for example, an aqueous solution such as water or an alcohol, an organic solvent or an oily liquid may be used. As the solvent, any of those which are capable of suspending the organic substance to be size-reduced without dissolving it can be used. Further, as the solvent, an inert or semi-inert liquid such as liquid helium or liquid nitrogen may be used. When such an inert or semi-inert liquid is used, the liquid can be vaporized immediately after the size reduction of the organic substance (formation of ultrafine particles of the organic substance), so that the ultrafine particles of the organic substance can be easily collected. Further, when an inert or semi-inert liquid is used, the temperature elevation by the irradiation of the laser beam can be suppressed, so that deterioration of the organic substance by the temperature elevation can be prevented.

The organic substance is preferably a particulate, insoluble organic drug. Further, it is preferable to reduce the size of the organic substance to 1 to 100 micro meters prior to suspending. By doing so, it becomes easier to render the size of the ultrafine particles of the organic substance closer to being uniform.

The supply part 20 has a predetermined volume. With respect to the volume, a desired volume for performing one treatment can be selected. Further, the supply part 20 is preferably sealable so that the concentration of the supplied suspension of the organic substance does not change.

At a lower portion of the supply part 20, a conduit 30 is connected, and the supply part 20 communicates with the conduit 30. The suspension of the organic substance charged into the supply part 20 can be discharged to the conduit 30.

The supply part 20 may have a supply vessel connected thereto for raw materials (not shown) which is capable of supplying both of the organic substance and the solvent as the raw materials for the suspension of the organic substance. By automatically supplying both of the organic substance and the solvent when the amount of the suspension of the organic substance becomes less than a predetermined amount, a continuous treatment can be performed over a long period.

<Pump 40>

As shown in FIG. 1, the conduit 30 is provided with a pump 40. The pump 40 supplies the suspension of the organic substance to the microflow channel 60 described below. The pump 40 is capable of controlling the flow of the suspension of the organic substance to a desired flow rate. Especially when the suspension of the organic substance is continuously passed through the microflow channel 60, it is desirable that the pump 40 be capable of controlling the flow of the suspension of the organic substance to a constant flow rate. On the other hand, when the suspension of the organic substance is intermittently passed through the microflow channel 60, it is desirable that the pump 40 be capable of stopping or allowing the flow of the suspension at a desired timing. When the flow of the suspension is stopped, a laser beam generated from the light source 10 can be reliably irradiated onto the organic substance.

<Microflow-Channel Introductory Part 50>

As shown in FIG. 1, the conduit 30 has a microflow-channel introductory part 50 connected thereto, and communicates with the microflow-channel introductory part 50. By driving the pump 40, the suspension of the organic substance charged into the supply part 20 can be supplied to the microflow-channel introductory part 50 via the conduit 30.

The microflow-channel introductory part 50 has a substantially cuboid shape. The microflow-channel introductory part 50 temporarily stores the suspension of the organic substance supplied from the supply part 20, so as to render uniform the flow rate of the suspension flowing through the microflow channel 60 described below. The volume of the microflow-channel introductory part 50 can be appropriately selected, depending on the type of the suspension of the organic substance to be treated, and the flow rate generated by the pump 40.

In the embodiment described above, the shape of the microflow-channel introductory part 50 is substantially cuboid. However, the shape of the microflow-channel introductory part 50 is not particularly limited, as long as the microflow-channel introductory part 50 is capable of rendering the flow rate of the suspension passing through the microflow channel 60 (described below) substantially uniform. For example, the microflow-channel introductory part 50 may be formed of a curved surface, such as a substantially cylindrical shape. The shape of the microflow-channel introductory part 50 can be appropriately selected depending on the flow rate of the suspension of the organic substance passing through the microflow channel 60, and the type and size of the organic substance within the suspension.

<Microflow Channel 60>

Figure 3:
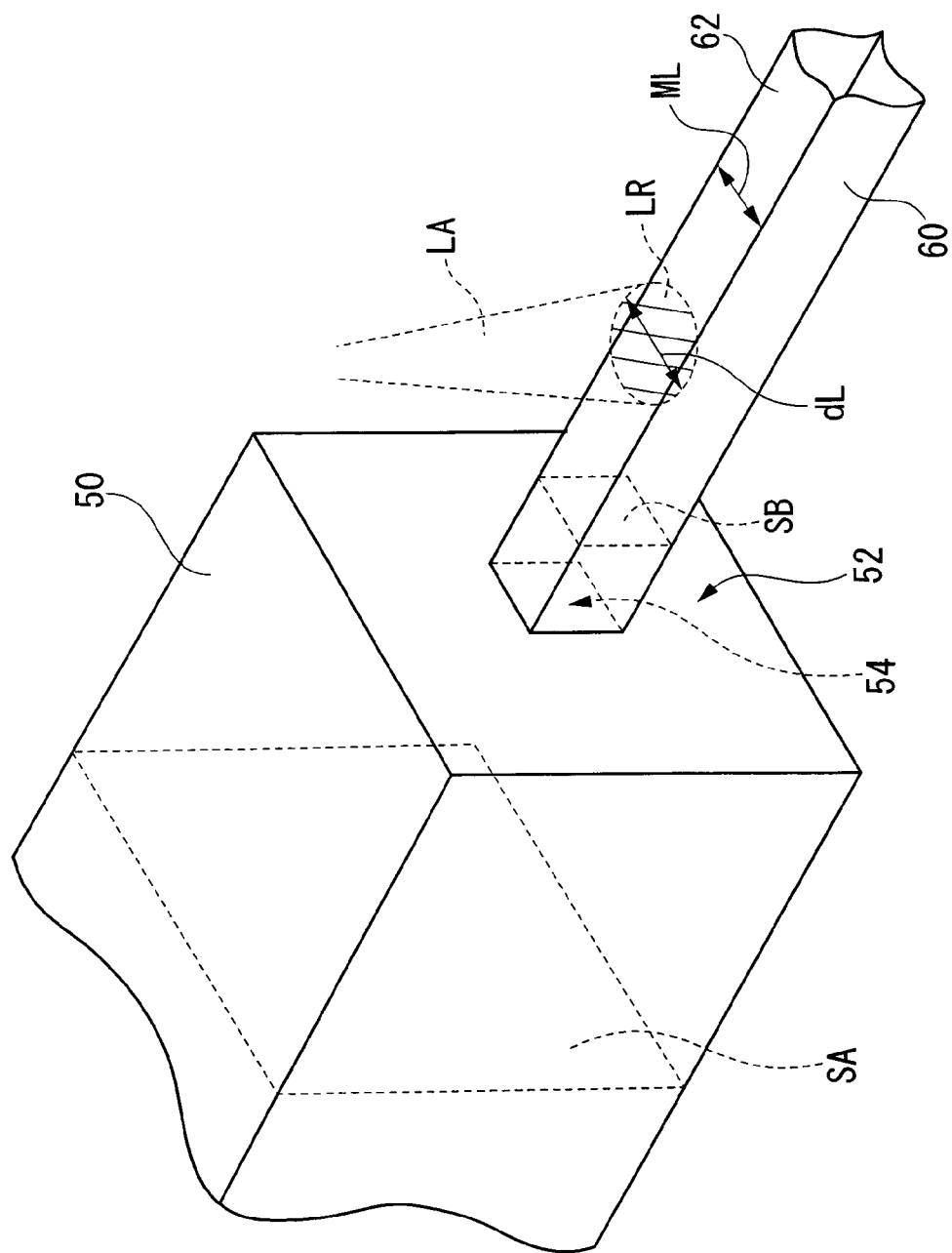
FIG. 3 is a schematic diagram showing an expanded, perspective view of the microflow-channel introductory part 50 and the microflow channel 60.

As shown in FIG. 1, the microflow-channel introductory part 50 has connected thereto the microflow channel 60, and communicates with the microflow channel 60. As shown in FIG. 3, the microflow-channel introductory part 50 has a discharge face 52. At substantially the center of the discharge face 52, an opening 54 is formed. The microflow channel 60 is connected to this opening 54. By this configuration, the suspension of the organic substance can be supplied from the microflow-channel introductory part 50 to the microflow channel 60 via the opening 54. Further, by discharging the suspension of the organic substance from substantially the center of the discharge face 52 of the microflow-channel introductory part 50, the suspension can be supplied to the microflow channel 60 with a substantially uniform flow rate.

[Mechanism of Formation of Ultrafine Particles]

By irradiating the laser beam generated from the light source 10 to the suspension of the organic substance passing through the microflow channel 60, ultrafine particles of the organic substance can be formed. The mechanism of the formation of ultrafine particles can be considered as follows. By irradiating a laser beam having a wavelength absorbable by the organic substance, the organic substance absorbs the beam, and a temperature elevation is rapidly caused at the portions where the beam was absorbed. This temperature elevation occurs instantly following the irradiation with the laser beam, so that temperature difference is generated between the portions where the beam was absorbed and the portions where the beam was not absorbed. This temperature difference generates a marked internal stress between the portions where the beam was absorbed and the portions where the beam was not absorbed, which in turn generates cracks in the organic substance, thereby breaking the organic substance. When the organic substance exhibits a large absorbance to the wavelength of the irradiated laser beam, the absorbance of the laser beam mainly occurs on the surface of the organic substance. In this case, temperature difference is generated between the surface and the inner portion, which in turn generates a stress in the inner portion of the organic substance and proceeds the breaking of the organic substance. When the breaking of the organic substance proceeds, the size of the organic substance is reduced, so that the laser beam gets uniformly absorbed over the entire organic substance. Even in this case, the surface of the organic substance gets cooled by the surrounding solvent, so that a temperature distribution is generated between the surface and the inner portion, which in turn generates a stress, thereby achieving the breaking of the organic substance.

[Shape of Microflow Channel 60]

The microflow channel 60 has a long cuboid shape, and the cross-section taken along the plane perpendicular to the lengthwise direction of the microflow channel 60 is substantially square. It is preferable that the length ML of a side of this square (see FIG. 3) is 1.1 to 200 times the diameter of the organic substance, more advantageously 3 to 60 times. By setting the length ML of a side of the square within this range, the flow of the organic substance within the microflow channel 60 can be smoothed, so that clogging of the microflow channel 60 by the organic substance can be avoided, and the laser beam can be accurately irradiated to the organic substance.

The shape of the microflow channel 60 is not particularly limited to cuboids, as long as the portion to be irradiated with the laser beam generated from the light source 10 (the portion located in the irradiation region LR described below) is even.

Further, in the embodiment described above, the cross-section taken along the plane perpendicular to the lengthwise direction of the microflow channel 60 is substantially square. However, the cross-section may be a rectangle or the like, as long as the laser beam can be accurately irradiated onto the organic substance.

[Material for Microflow Channel 60]

The microflow channel 60 is made of a transparent material such as quartz glass, which is capable of transmitting the laser beam generated from the light source 10. Further, the entire microflow channel 60 may not necessarily be integrally formed, and may be made decomposable. By making the microflow channel 60 decomposable, the inside of the microflow channel 60 can be washed, so as to prevent contamination. In addition, by making the microflow channel 60 decomposable, a part of the microflow channel 60 may be reused by exchange or the like. When the microflow channel 60 is to be made decomposable, it is preferable to make the bonded areas even by lapping. By making the bonded areas even, leakage of the suspension from the bonded areas of the assembled microflow channel 60 can be reliably prevented.

Alternatively, the microflow channel 60 may be made of a transparent plastic. By using a transparent plastic as the material for the microflow channel 60, the microflow channel 60 can be produced by molding or the like. As a result, the cost of the apparatus for forming ultrafine particles can be lowered. Further, when the microflow channel gets contaminated, the microflow channel 60 can be disposed immediately. That is, by using a transparent plastic as the material for the microflow channel 60, a disposable microflow channel can be made, so that formation of ultrafine particles can be constantly performed under clean conditions.

The microflow channel 60 need not be entirely transparent, as long as the portion to be irradiated with the laser beam generated from the light source 10 (the portion located in the irradiation region LR described below) is capable of transmitting the laser beam.

[Irradiation Region LR]

As shown in FIG. 3, the laser beam LA generated from the light source 10 is irradiated to a portion of the upper face 62 of the microflow channel 60. The irradiation region LR of the laser beam LA (the region indicated with oblique lines in FIG. 3) is substantially a circle. By making the diameter dL of the irradiation region LR longer than the length ML of the shortwise direction of the upper face 62, the laser beam can be satisfactorily irradiated to the microflow channel 60.

[Irradiation Region LR and Irradiation Period tL]

By driving the above-mentioned pump 40, the suspension of the organic substance is allowed to flow into the microflow channel 60 from the microflow-channel introductory part 50, and the organic substance passes through the microflow channel 60. Drawing attention to a certain organic substance, the organic substance passes through the microflow channel 60 following the flow of the suspension to arrive at the irradiation region LR of the laser beam LA. The organic substance is present in the irradiation region LR for a while, and then, the organic substance comes out of the irradiation region LR.

When a pulsed laser beam is used and the organic substance is present in the irradiation region LR for a long time, the organic substance gets irradiated with a pulsed beam a plurality of times. As described above, when the organic substance is allowed to pass through the microflow channel 60, the irradiation period tL can be regarded as the period during which the organic substance is present in the irradiation region LR.

As described above, by irradiating the organic substance with the laser beam, ultrafine particles of the organic substance can be formed. The number of irradiations of the organic substance with a pulsed beam can be determined, so as to form ultrafine particles having a desired size. The number of irradiations with a pulsed beam can be changed by adjusting the above-mentioned pulse period T or the flow rate of the organic substance. Thus, in the irradiation region LR of the laser beam, the organic substance is irradiated with a pulsed beam at least once.

[Size of the Cross-Sectional Area of Microflow Channel 60]

It is preferable that the cross-sectional area SA (see FIG. 3) of the microflow-channel introductory part 50 be two times or more of the cross-sectional area SB (see FIG. 3) taken along the plane perpendicular to the lengthwise direction of the microflow channel 60. In general, the flow rate VL of the organic substance passing through the microflow channel 60 tends to exhibit a distribution (hereafter, referred to as a "flow rate distribution") such that the flow becomes slowest near the walls of the microflow channel and fastest near the center line of the microflow channel (see FIG. 4B). When such a flow rate distribution is generated, the organic substance flowing near the walls of the microflow channel 60 exhibits a low flow rate, so that the period during which the organic substance is present in the irradiation region LR becomes long. On the other hand, in such a case, the organic substance flowing near the center line of the microflow channel 60 exhibits a high flow rate, so that the period during which the organic substance is present in the irradiation region LR becomes short. That is, when a pulsed laser beam is irradiated, the number of pulsed beam irradiations of the organic substance flowing near the walls of the microflow channel 60 becomes large, whereas the number of pulsed beam irradiations of the organic substance flowing near the center line of the microflow channel 60 becomes small. Thus, the amount of the size-reduction treatment of the organic substance varies depending on the position at which the organic substance flows, so that it is possible that the size of the ultrafine particles of the organic substance becomes heterogeneous. By making the cross-sectional area SA of the microflow-channel introductory part 50 two or more times the cross-sectional area SB of the microflow channel 60, the flow rate distribution of the organic substance can be rendered substantially uniform, so that heterogeneity in the size of the ultrafine particles of the organic substance can be prevented.

[Flow Rate VL of Organic Substance Passing Through Microflow Channel 60]

As described above, by driving the above-mentioned pump 40, the suspension of the organic substance is allowed to flow into the microflow channel 60 from the microflow-channel introductory part 50. The flow rate VL (see FIG. 4A) of the organic substance passing through the microflow channel 60 preferably satisfies the relation $VL < K \times dL/tL$. Here, the flow rate VL is the flow rate of the organic substance which is in a state where the above-mentioned flow rate distribution is not observed, or in a state where the above-mentioned flow rate distribution can be disregarded. By setting the flow rate VL of the organic substance within the above-mentioned range, the organic substance can be irradiated with the laser beam without any excess or deficiency of irradiation, so that the organic substance can be reduced to a desired size. For example, when the organic substance is irradiated with a pulsed laser beam, the irradiation can be performed an appropriate number of times.

Here, dL represents the diameter of the laser beam upon irradiation (see FIG. 3), tL represents the above-mentioned irradiation period (see FIG. 2), and K represents a constant which can be determined within the range of 1 to 0.1, depending on the type of organic substance. K is not particularly limited to the above-mentioned range, and is preferably set such that the number of pulsed beam irradiations of the organic substance passing the irradiation region LR becomes sufficient for forming ultrafine particles of the organic substance.

The thus formed ultrafine particles of the organic substance preferably have a size of 10 to 500 nm.

[Irradiation Position of Laser Beam]

Figure 4A:
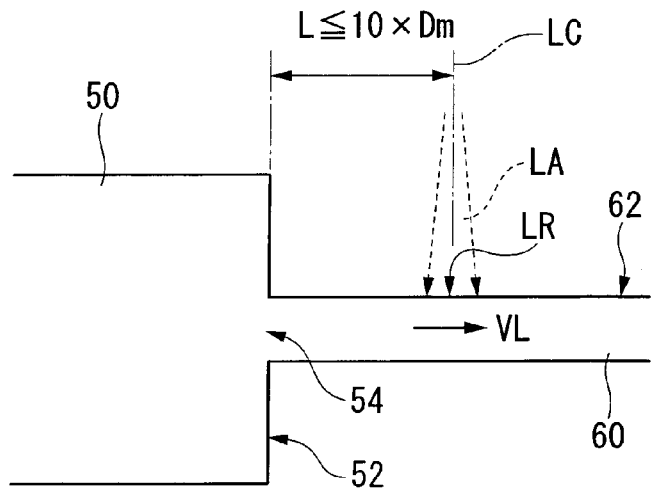
FIG. 4A is a cross-sectional view of the microflow-channel introductory part 50 and the microflow channel 60.

FIG. 4A is a cross-sectional view of the microflow-channel introductory part 50 and the microflow channel 60. In the microflow channel 60, with respect to the portion to be irradiated with the laser beam LA, it is preferable that the distance from the discharge face 52 of the microflow-channel introductory part 50 to the center LC of the irradiation region LR of the laser beam LA be no more than $10 \times Dm$ (see FIG. 4A). Here, Dm is the hydraulic diameter of the microflow channel 60, and Dm is equal to $4 \times$(cross-sectional area SB of the microflow channel 60)/(Perimeter of the cross-section of the microflow channel 60). For example, when the cross-section of the microflow channel 60 is a square having a length of ML on each side, Dm is calculated as follows:

$$Dm = 4 \times ML^2 / 4ML = ML$$

The above-mentioned flow rate distribution of the organic substance passing through the microflow channel 60 tends to increase as the organic substance flows away from the discharge face 52 of the microflow-channel introductory part 50. Therefore, by setting the portion to be irradiated with the laser LA within the above-mentioned range, the organic substance can be irradiated with the laser beam LA before the flow rate distribution of the organic substance passing through the microflow channel 60 becomes large, so that ultrafine particles of the organic substance can be reliably formed, and the size of the ultrafine particles can be rendered substantially uniform.

[Transition Part 64]

In the embodiment described above, the microflow channel 60 is directly connected to the opening 54 formed in the microflow-channel introductory part 50. However, as shown in FIG. 4C, a transition part 64 may be formed between the microflow-channel introductory part 50 and the microflow channel 60. The transition part 64 is formed in a manner such that the cross-section thereof becomes smaller as it becomes further from the opening 54 formed in the microflow-channel introductory part 50. The transition part 64 formed in this manner functions as an approach section, so as to render the flow rate of the organic substance flowing into the microflow channel 60 closer to being uniform. The shape of the transition part 64 can be appropriately selected depending on the flow rate, viscosity and density of the suspension of the organic substance, and the interfacial effect of the wall of the transition part 64, such that turbulence of the flowing suspension does not occur at the connected portion between the discharge face 52 and the transition part 64, or the connected portion between the microflow channel 60 and the transition part 64.

<Collecting Part 70>

As shown in FIG. 1, the microflow channel 60 has a collecting part 70 connected thereto, and communicates with the collecting part 70. The collecting part 70 is a vessel for storing the suspension of the organic substance which has been irradiated with the laser beam within the microflow channel 60.

It is preferable that the collecting part 70 be provided with an agglomeration prevention device 72. The agglomeration prevention device 72 includes a piezoelectric transducer which applies ultrasonic waves to the suspension stored in the collecting part 70. By the propagation of the ultrasonic wave to the suspension, the ultrafine particles of the organic substance can be prevented from agglomeration. The intensity and wavelength of the ultrasonic waves generated from the agglomeration prevention device 72 can be appropriately selected depending on the size of the ultrafine particles of the organic substance and the type of the organic substance. In the embodiment described above, the exemplified agglomeration prevention device 72 generates ultrasonic waves to effect the prevention of agglomeration. However, any other agglomeration prevention device which is capable of preventing agglomeration of the ultrafine particles of the organic substance may be used.

In the vessel of the collecting part 70, a magnetic-drive impeller 74 may be provided. The magnetic-drive impeller 74 can be rotated by applying a magnetic field from the outside of the collecting part 70. By rotating the magnetic-drive impeller 74, the suspension stored within the collecting part 70 can be stirred, thereby preventing agglomeration of the ultrafine particles of the organic substance. The size and number of revolutions of the magnetic-drive impeller 74 can be appropriately selected depending on the size of the ultrafine particles of the organic substance and the type of the organic substance.

Further, the collecting part 70 may be provided with a cyclone separator (not shown). The cyclone separator is capable of separating ultrafine particles from particles which have not been sufficiently size-reduced, depending on the difference in density of the organic substance, and the difference in resistance during transfer of particles of various sizes. By allowing the suspension to flow from the collecting part 70 and treating with the cyclone separator, ultrafine particles can be separated from the particles which have not been sufficiently size-reduced. The particles which have not been sufficiently size-reduced can be charged into the supply part 20 and subjected to the size-reducing treatment (formation of ultrafine particles) again.

Second Embodiment

The first embodiment described above illustrated a microflow-channel introductory part 50 having one microflow channel 60 connected thereto. However, a plurality of microflow channels may be connected to a microflow-channel introductory part. In the second embodiment, as in the first embodiment, a light source 10 (not shown) is used which generates a pulsed laser beam, i.e., a light source capable of intermittently generating a laser beam.

Figure 5:
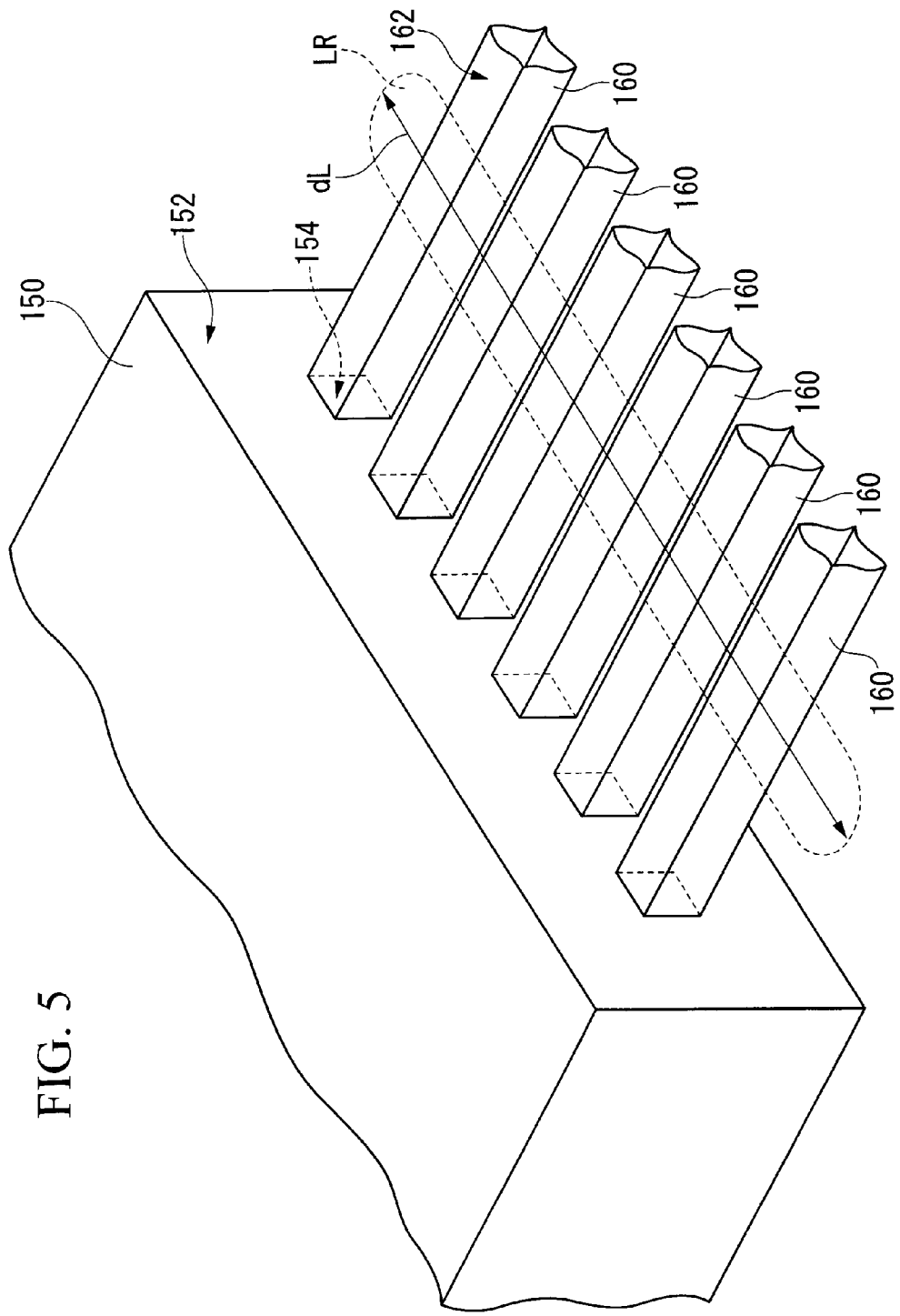
FIG. 5 is an expanded, perspective view showing an embodiment in which six microflow channels 160 are connected to a microflow-channel introductory part 150.

As shown in FIG. 5, the microflow-channel introductory part 150 has six microflow channels 160 connected thereto, and the microflow-channel introductory part 150 communicates with the microflow channels 160. Each of the six microflow channels 160 shown in FIG. 5 has the same size and shape as the microflow channel 60 used in the first embodiment.

Further, as in the first embodiment, the microflow-channel introductory part 150 has a supply part 20 (not shown) connected thereto, and a suspension of an organic substance stored in the supply part 20 is introduced into the microflow-channel introductory part 150 by a pump 40 (not shown). Furthermore, as in the first embodiment, each of the six microflow channels 160 has a collecting part 70 (not shown) connected thereto, and the organic substance which has been irradiated with a laser beam in the six microflow channels 160 is discharged to the collecting part 70.

The microflow-channel introductory part 150 has a substantially cuboid shape. The microflow-channel introductory part 150, like the microflow-channel introductory part 50, temporarily stores the suspension of the organic substance supplied from the supply part 20, so as to render uniform the flow rate of the flow of the suspension generated by the pump 40. In the second embodiment, the microflow-channel introductory part 150 has six microflow channels 160 connected thereto, so that the amount of the organic substance to be treated can be increased. Therefore, it is preferable that the volume of the microflow-channel introductory part 150 be enlarged, depending on the amount of the organic substance to be treated.

The microflow-channel introductory part 150 has a discharge face 152. The discharge face 152 has six openings 154 which are formed along a horizontal line (not shown) passing through substantially the center of the discharge face 152. The six openings 154 respectively have six corresponding microflow channels 160 connected thereto, and the six microflow channels 160 are arranged in parallel along the horizontal direction. By this configuration, the suspension of the organic substance stored in the microflow-channel introductory part 150 can be allowed to flow into all of the six microflow channels 160.

As shown in FIG. 5, a laser beam LA generated from the light source 10 (not shown) is irradiated to a part of the respective upper faces 162 of the six microflow channels 160. The irradiation region LR of the laser beam LA (the region indicated with oblique lines in FIG. 5) is substantially an ellipse. By making the major axis dL long enough to extend over the six microflow channels 160, the laser beam can be sufficiently irradiated to the six microflow channels 160. The shape of the irradiation region LR of the laser beam LA can be rendered substantially elliptical by using an optical device such as a lens to appropriately change the light path between the light source 10 and the six microflow channels 160.

By using a plurality of microflow channels, the number of microflow channels which can be irradiated with a laser beam increases, so that the amount of the organic substance to be size-reduced can be increased. Although FIG. 5 shows an example of a microflow-channel introductory part 150 having six microflow channels 160, the number of microflow channels is not particularly limited, and can be appropriately selected depending on the amount of organic substance to be size-reduced, and the size of the irradiation region LR of the laser beam, etc.

Third Embodiment

In the second embodiment described above, the laser beam generated from the light source 10 is directly irradiated to the plurality of microflow channels. However, the laser beam may be irradiated via a lens. In the third embodiment, as in the first embodiment, a light source 10 (not shown) is used which generates a pulsed laser beam, i.e., a light source capable of intermittently generating a laser beam.

Figure 6:
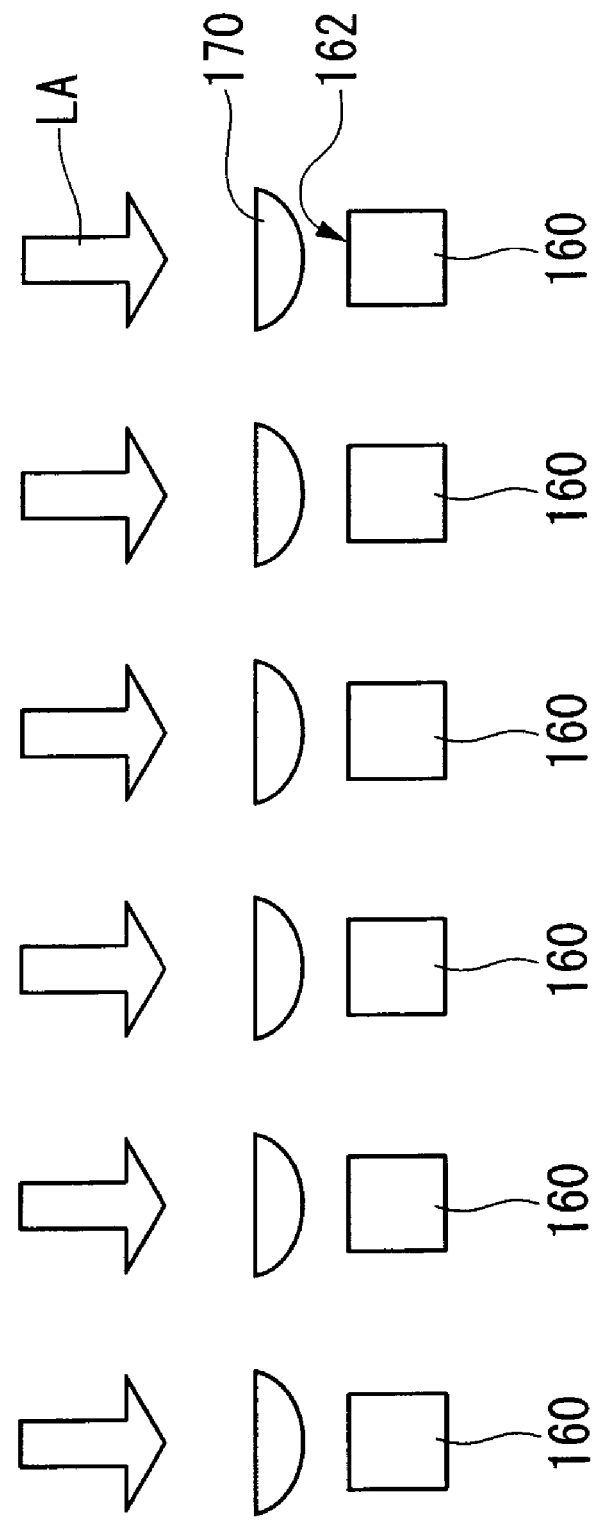
FIG. 6 is a cross-sectional view showing an embodiment in which cylindrical lenses 170 are respectively arranged just above six microflow channels 160.

FIG. 6 is a cross-sectional view showing an embodiment in which cylindrical lenses 170 are respectively arranged just above six microflow channels 160. The six microflow channels 160 shown in FIG. 6 are the same as those used in the second embodiment, and are therefore referred to with the same reference numeral. Namely, the six microflow channels 160 are connected to a microflow-channel introductory part 150 (not shown), and the microflow-channel introductory part 150 communicates with the six microflow channels 160. Each of the six microflow channels 160 shown in FIG. 6 has the same size and shape as the microflow channel 60 used in the first embodiment.

Further, as in the first embodiment, the microflow-channel introductory part 150 has a supply part 20 (not shown) connected thereto, and a suspension of an organic substance stored in the supply part 20 is introduced into the microflow-channel introductory part 150 by a pump 40 (not shown). Furthermore, as in the first embodiment, each of the six microflow channels 160 has a collecting part 70 (not shown) connected thereto, and the organic substance which has been irradiated with a laser beam in the six microflow channels 160 is discharged to the collecting part 70.

As shown in FIG. 6, above the six microflow channels 160, six corresponding cylindrical lenses 170 are respectively arranged. Each of the cylindrical lenses 170 has a cylindrical refraction face, and has a long body as a whole. The cylindrical lenses 170 are arranged so that the longitudinal direction thereof extends along the longitudinal direction of the upper faces 162 of the microflow channels 160. By this configuration, the irradiation region of the laser beam LA generated from the light source 10 can be matched with the width ML (see FIG. 3) of the six microflow channels 160. As a result, the laser beam LA can be focused at the upper faces 162 of the respective microflow channels 160, so as to efficiently irradiate the laser beam LA to the organic substance passing through the six microflow channels 160.

Fourth Embodiment

In the third embodiment described above, six cylindrical lenses are used. However, a galvano mirror and an fθ lens may be used instead. In the fourth embodiment, as in the first embodiment, a light source 10 (not shown) is used which generates a pulsed laser beam, i.e., a light source capable of intermittently generating a laser beam.

Figure 7:
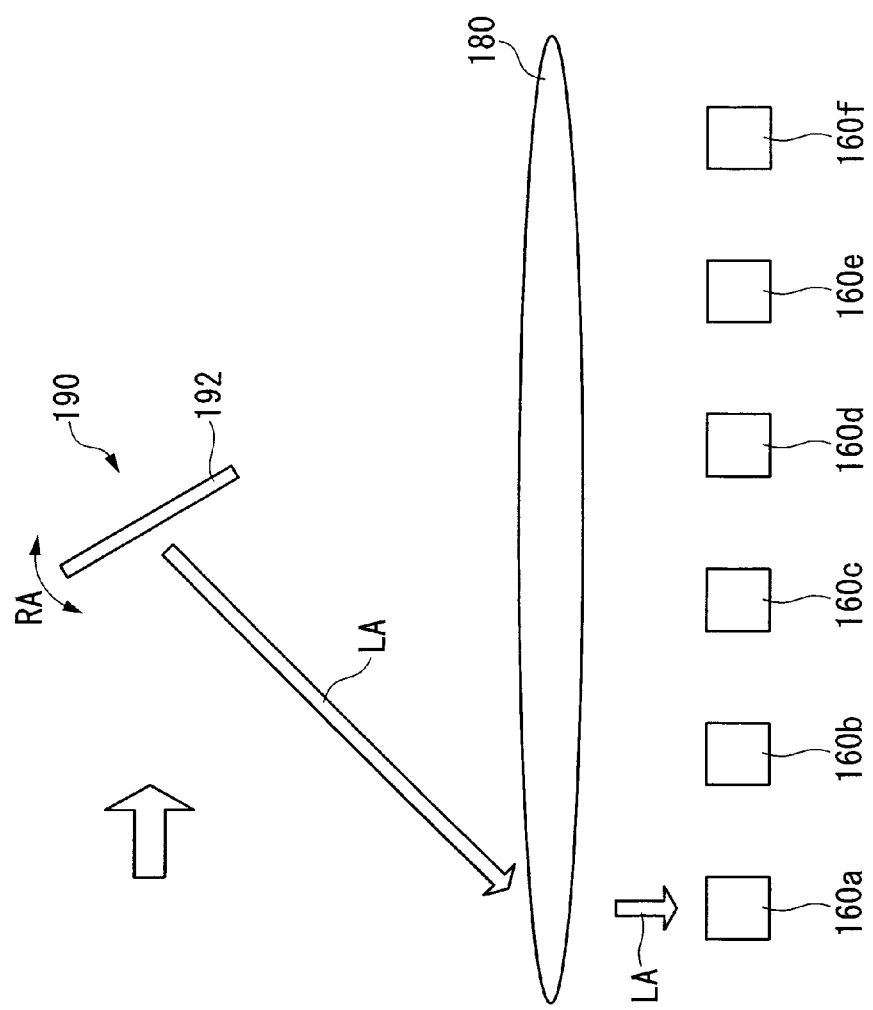
FIG. 7 is a cross-sectional view showing an embodiment in which an fθ lens 180 is provided just above six microflow channels 160 (160a through 160f), and a galvano mirror 190 is provided above the fθ lens 180.

FIG. 7 is a cross-sectional view showing an embodiment in which an fθ lens 180 is provided above six microflow channels 160, and a galvano mirror 190 is provided above the fθ lens 180. The six microflow channels 160 shown in FIG. 7 are the same as those used in the second embodiment, and are therefore referred to with the same reference numeral. Namely, the six microflow channels 160 are connected to a microflow-channel introductory part 150 (not shown), and the microflow-channel introductory part 150 communicates with the six microflow channels 160. Each of the six microflow channels 160 shown in FIG. 7 has the same size and shape as the microflow channel 60 used in the first embodiment. Further, in the fifth embodiment, as shown in FIG. 7, the six microflow channels 160 are respectively referred to as microflow channels 160a through 160f.

Further, as in the first embodiment, the microflow-channel introductory part 150 has a supply part 20 (not shown) connected thereto, and a suspension of an organic substance stored in the supply part 20 is introduced into the microflow-channel introductory part 150 by a pump 40 (not shown). Furthermore, as in the first embodiment, each of the six microflow channels 160 has a collecting part 70 (not shown) connected thereto, and the organic substance which has been irradiated with a laser beam in the six microflow channels 160 is discharged to the collecting part 70.

The galvano mirror 190 shown in FIG. 7 has a reflection mirror 192 which is rotatable around an axis (an axis perpendicular to the plane of FIG. 7), and an electric motor (not shown) for rotating the reflection mirror 192 around the axis. By transmitting a predetermined control signal to the electric motor, the reflection mirror 192 can be rotated around an angle corresponding to the control signal, so that an incident beam entering the reflection mirror 192 can be reflected toward a desired direction.

As shown in FIG. 7, the laser beam generated from the light source 10 enters the reflection mirror 192 of the galvano mirror 190 from the left-hand side of the drawing. The reflection mirror is rotatable clockwise or anti-clockwise (illustrated with the arrow RA in FIG. 7), and the laser beam which entered the reflection mirror 192 is reflected toward the microflow channels 160a to 160f via the fθ lens 180 described below.

In the example shown in FIG. 7, it is assumed that the electric motor controls the rotational angle of the reflection mirror 192 of the galvano mirror 190 to the first through sixth angles. Further, it is assumed that the relation between the first through sixth angles and the signals for controlling the electric motor is memorized in advance by a control unit (not shown) for controlling the electric motor. When the electric motor is controlled so as to change the rotational angle of the reflection mirror 192 of the galvano mirror 190 to the first angle, the laser beam reflected by the reflection mirror 192 is directed toward the microflow channel 160a via the fθ lens 180 described below. Similarly, when the rotational angle of the reflection mirror 192 is changed to any one of the second through sixth angles, the laser beam is directed toward any one of the microflow channels 160b to 160f corresponding to the rotational angle. In this manner, all of the laser beams generated from the light source 10 can be irradiated into any one of the six microflow channels 160a to 160f without lowering the intensity of the laser beams.

The fθ lens 180 has a size which enables the fθ lens 180 to extend over all of the six microflow channels 160, and is provided above the six microflow channels 160. By using the fθ lens 180, the position of the laser beam emitted from the fθ lens 180 can be rendered proportional to the incident angle of the laser beam entering the fθ lens 180. The position of the laser beam emitted from the fθ lens 180 is the position in which the optical axis of the fθ lens 180 is regarded as the origin. By using the fθ lens 180, the laser beam LA can be irradiated to the microflow channels 160 positioned away from the optical axis of the fθ lens 180 without lowering the intensity of the laser beam LA. In this manner, even in the case where a plurality of microflow channels 160 is used, the laser beam can be irradiated to each of the microflow channels 160 with substantially uniform intensity.

As described above, in the fourth embodiment, a light source 10 is used which generates a pulsed laser beam, i.e., a light source capable of intermittently generating a laser beam. Therefore, it is necessary that the rotation of the reflection mirror 192 of the galvano mirror 190 be controlled while the pulsed laser beam is not generated from the light source 10.

For controlling the rotation of the reflection mirror 192, a Q-switch of the light source 10 is used. The Q-switch functions as a shutter for stopping the generation of the laser beam from the light source 10. By controlling the Q-switch, the on- and off-state of the laser beam can be determined, so that pulsed laser beams can be generated from the light source 10. The above-mentioned control unit for the electric motor of the galvano mirror 190 can determine whether or not a pulsed beam is generated from the light source 10 by acquiring the signal for controlling the Q-switch. When it is determined that a pulsed beam is not generated, the reflection mirror 192 can be rotated to a desired angle by driving the electric motor of the reflection mirror 192.

Alternatively, instead of using the Q-switch of the light source 10, a detection device such as a photodiode for detecting the intensity of the pulsed laser beam generated from the light source 10 may be provided in the light path between the light source 10 and the microflow channels 160, so as to determine whether or not a pulsed beam is generated from the light source 10. In this case, the above-mentioned control unit for the electric motor of the galvano mirror 190 can determine whether or not a pulsed beam is generated from the light source 10 by acquiring a detection signal from the detection device for detecting the intensity of the pulsed laser beam.

Fifth Embodiment

Figure 8:
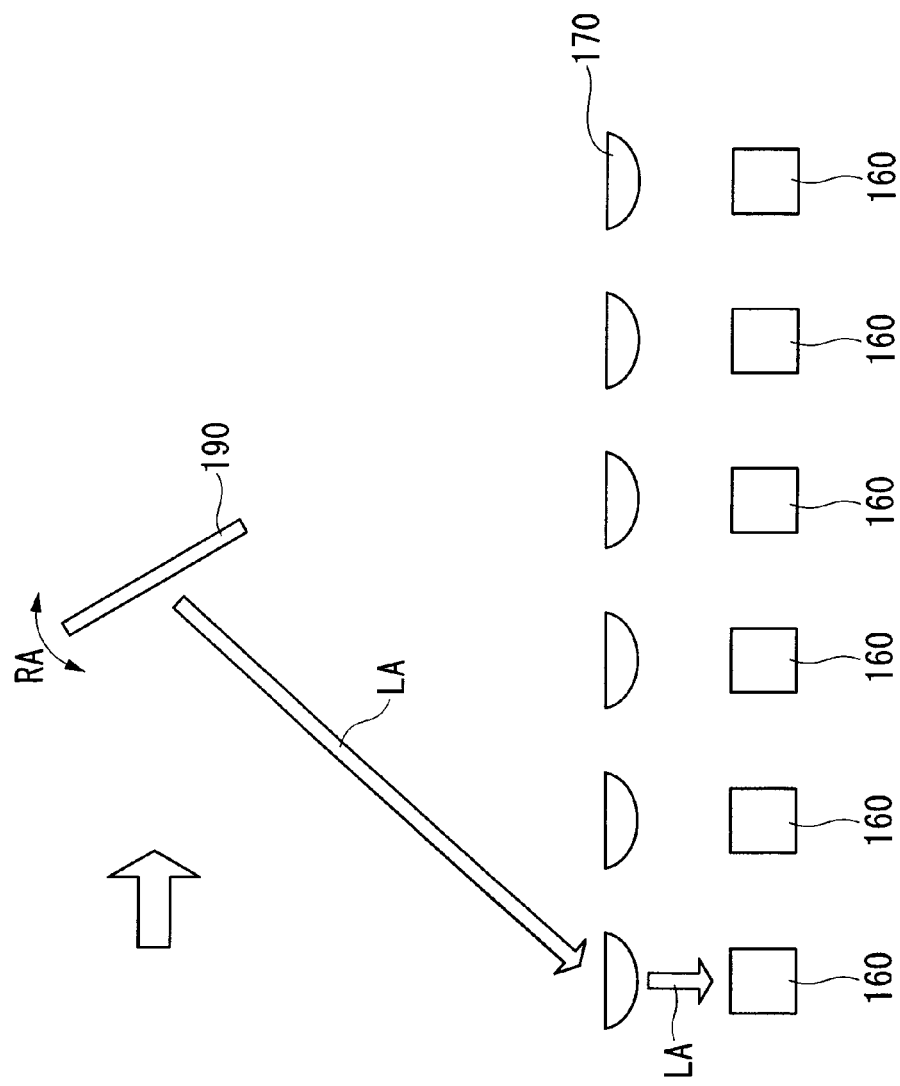
FIG. 8 is a cross-sectional view showing an embodiment in which cylindrical lenses 170 are respectively arranged just above six microflow channels 160, and a galvano mirror 190 is provided above the cylindrical lenses 170.

FIG. 8 is a cross-sectional view showing an embodiment in which cylindrical lenses 170 are respectively arranged just above six microflow channels 160, and a galvano mirror 190 is provided above the cylindrical lenses 170. In the fifth embodiment, as in the first embodiment, a light source 10 (not shown) is used which generates a pulsed laser beam, i.e., a light source capable of intermittently generating a laser beam.

The six microflow channels 160 shown in FIG. 8 are the same as those used in the second embodiment, and are therefore referred to with the same reference numeral. Namely, the six microflow channels 160 are connected to a microflow-channel introductory part 150 (not shown), and the microflow-channel introductory part 150 communicates with the six microflow channels 160. Each of the six microflow channels 160 shown in FIG. 8 has the same size and shape as the microflow channel 60 used in the first embodiment.

Further, as in the first embodiment, the microflow-channel introductory part 150 has a supply part 20 (not shown) connected thereto, and a suspension of an organic substance stored in the supply part 20 is introduced into the microflow-channel introductory part 150 by a pump 40 (not shown). Furthermore, as in the first embodiment, each of the six microflow channels 160 has a collecting part 70 (not shown) connected thereto, and the organic substance which has been irradiated with a laser beam in the six microflow channels 160 is discharged to the collecting part 70.

The six cylindrical lenses 170 are the same as those used in the third embodiment, and are therefore referred to with the same numeral. Further, the galvano mirror 190 is the same as that used in the fourth embodiment, and is therefore referred to with the same reference numeral.

The galvano mirror 190 is controlled in the same manner as in the fourth embodiment. By the galvano mirror 190, the laser beam generated from the light source 10 can be irradiated into one microflow channel 160 selected from the six microflow channels 160 without lowering the intensity of the laser beam.

Further, by using the cylindrical lenses 170, the laser beam LA generated from the light source 10 can be focused along the longitudinal direction of the respective upper faces 162 of the six microflow channels 160, so that the organic substance can be efficiently irradiated with the laser beam.

Sixth Embodiment

Figure 9:
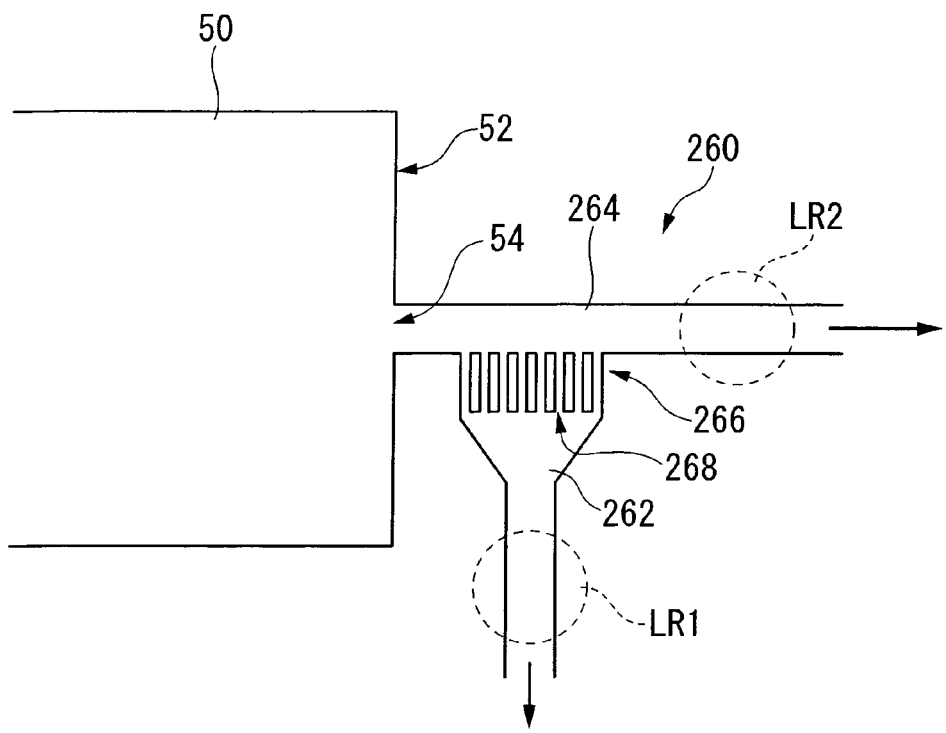
FIG. 9 is a plane view showing an embodiment in which a microflow channel 260 connected to an opening 54 of a microflow-channel introductory part 50 is branched into two microflow channels 262 and 264.

FIG. 9 is a plane view showing an embodiment in which a microflow channel 260 connected to an opening 54 of a microflow-channel introductory part 50 is branched into two microflow channels 262 and 264. The microflow-channel introductory part 50 has connected thereto the microflow channel 260, and communicates with the microflow channel 260. In the sixth embodiment, as in the first embodiment, a light source 10 (not shown) is used which generates a pulsed laser beam, i.e., a light source capable of intermittently generating a laser beam.

As shown in FIG. 9, eight fine pores 268 are formed at the inflow end 266 of the microflow channel 262. The microflow channels 262 and 264 have substantially the same shape as the microflow channel 60 used in the first embodiment, except for the portions at which the eight fine pores 268 are formed and the vicinity thereof.

Further, as in the first embodiment, the microflow-channel introductory part 50 has a supply part 20 (not shown) connected thereto, and a suspension of an organic substance stored in the supply part 20 is introduced into the microflow-channel introductory part 50 by a pump 40 (not shown).

The above-mentioned fine pores 268 of the microflow channel 262 have either a hydrophobic material or a hydrophilic material coated on the surfaces thereof. The microflow channel 264 is formed adjacently to the inflow end 266 of the microflow channel 262.

When a hydrophilic material is coated on the surfaces of the fine pores 268 of the microflow channel 262, bubbles generated within the suspension of the organic substance can be prevented from flowing into the microflow channel 262. In this manner, it becomes possible to allow only the suspension of the organic substance to flow into the microflow channel 262, and the bubbles can be led to the microflow channel 264. In this case, the region LR1 illustrated by a circle with a broken line is used as the irradiation region of the laser beam. By using the region LR1, the laser beam can be accurately irradiated onto the organic substance without being obstructed by the bubbles. In this case, as in the first embodiment, the microflow channel 262 has a collecting part 70 (not shown) connected thereto, and the organic substance irradiated with the laser beam within the microflow channel 262 is discharged to the collecting part 70.

Alternatively, when a hydrophobic material is coated on the surfaces of the fine pores 268 of the microflow channel 262, the bubbles generated within the suspension of the organic substance can be attracted to the pores 268 of the microflow channel 262. In this manner, the bubbles can be led to the microflow channel 262, and it becomes possible to allow only the suspension of the organic substance to flow into the microflow channel 264. In this case, the region LR2 illustrated by a circle with a broken line is used as the irradiation region of the laser beam. By using the region LR2, the laser beam can be accurately irradiated to the organic substance without being obstructed by the bubbles. In this case, as in the first embodiment, the microflow channel 264 has a collecting part 70 (not shown) connected thereto, and the organic substance irradiated with the laser beam within the microflow channel 264 is discharged to the collecting part 70.

The intervals between mutually adjacent fine pores 264 of the microflow channel 262 can be appropriately selected depending on whether the bubbles or the suspension of the organic substance is allowed to pass therethrough. Further, in the example shown in FIG. 9, the microflow channel 262 and the microflow channel 264 forms a substantially right angle. However, this angle is not particularly limited, and can be appropriately selected depending on the size of the bubbles, or the size, type and/or flow rate of the organic substance.

Seventh Embodiment

Figure 10:
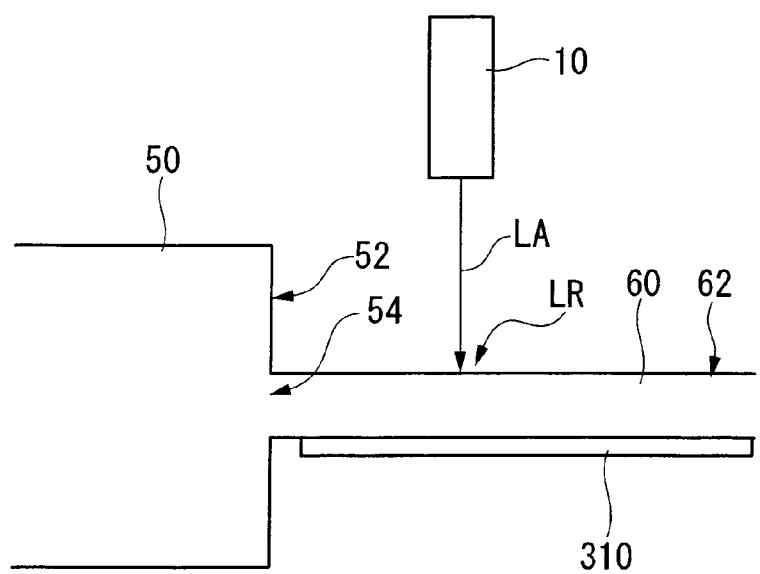
FIG. 10 is a side view showing an embodiment in which a microflow channel 60 is provided with a peltier device 310.

FIG. 10 is a side view showing an embodiment in which a microflow channel 60 is provided with a peltier device 310. In the seventh embodiment, as in the first embodiment, a light source 10 (not shown) is used which generates a pulsed laser beam, i.e., a light source capable of intermittently generating a laser beam.

The microflow channel 60 shown in FIG. 10 has the same size and shape as the microflow channel 60 used in the first embodiment. The microflow-channel introductory part 50 has the microflow channel 60 connected thereto, and communicates with the microflow channel 60.

Further, as in the first embodiment, the microflow-channel introductory part 50 has a supply part 20 (not shown) connected thereto, and a suspension of an organic substance stored in the supply part 20 is introduced into the microflow-channel introductory part 150 by a pump 40 (not shown). Furthermore, as in the first embodiment, the microflow channel 60 has a collecting part 70 (not shown) connected thereto, and the organic substance which has been irradiated with a laser beam in the microflow channel 60 is discharged to the collecting part 70.

The peltier device 310 cools the suspension of the organic substance passing through the microflow channel 60 from the outside of the microflow channel 60. In the microflow channel 60, the organic substance is irradiated with a laser beam in the irradiation region LR. By the irradiation, the temperature of the organic substance is elevated, such that the organic substance may be deteriorated. Therefore, by cooling the suspension of the organic substance passing through the microflow channel 60 by using the peltier device 310, the deterioration of the organic substance can be prevented.

The peltier device 310 operates by applying an electric current to a connected portion of two types of metals to transfer heat from one metal to the other to thereby effect cooling, and does not have a moving part. Therefore, even when the peltier device 310 is mounted on the microflow channel 60, the peltier device 310 does not cause vibration or deformation of the microflow channel 60, so that the laser beam can be accurately irradiated to the microflow channel. Further, since the peltier device 310 does not have a moving part, it can be directly mounted on the microflow channel 60, so that the cooling effect can be enhanced.

Although FIG. 10 exemplifies a peltier device as a cooling device, any other cooling device may be used. The cooling device can be appropriately selected depending on the desired temperature and cooling ability.

Eighth Embodiment

Figure 11:
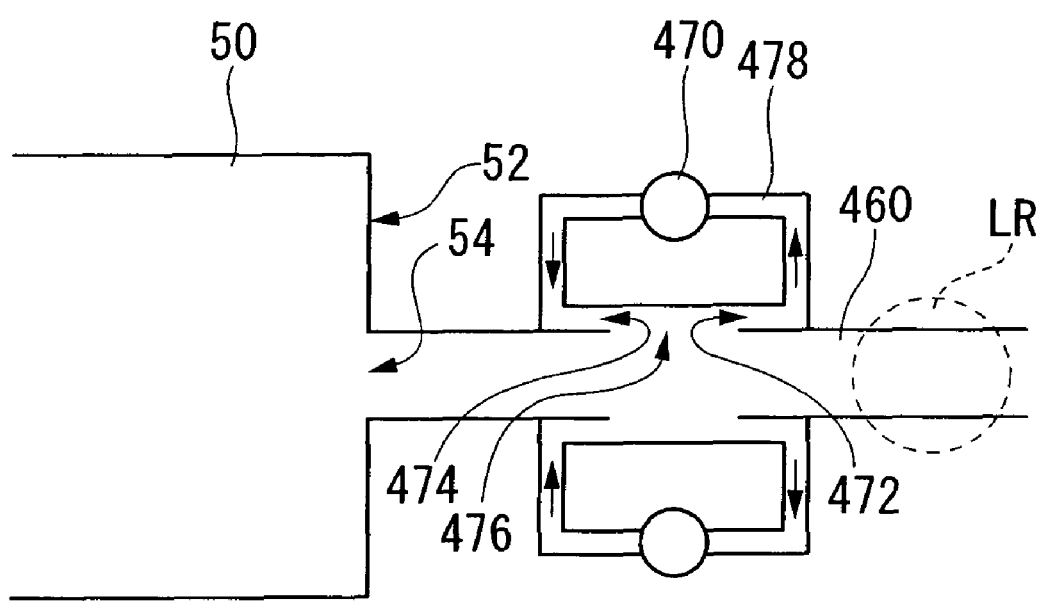
FIG. 11 is a plane view showing an embodiment in which a microflow channel 460 is provided with a pump 470 on the wall thereof.

FIG. 11 is a plane view showing an embodiment in which a microflow channel 460 is provided with a pump 470 on the wall thereof. In the eighth embodiment, as in the first embodiment, a light source 10 (not shown) is used which generates a pulsed laser beam, i.e., a light source capable of intermittently generating a laser beam.

As shown in FIG. 11, an opening 476 including an inflow opening 472 and an outflow opening 474 is formed in the wall of the microflow channel 460. A flow channel 478 is provided between the inflow opening 472 and the outflow opening 474, such that the inflow opening 472 communicates with the outflow opening 474. The microflow channel 460 shown in FIG. 11 has substantially the same size and shape as the microflow channel 60 used in the first embodiment, except for the portion at which the opening 476 is formed. The microflow-channel introductory part 50 has the microflow channel 460 connected thereto, and communicates with the microflow channel 460.

The flow channel 478 connected to the opening 476 of the microflow channel 460 is provided with a pump 470. By driving the pump 470, the suspension of the organic substance passing through the microflow channel 460 can be allowed to flow through the inflow opening 472. The suspension of the organic substance allowed to flow through the inflow opening 472 is passed through the flow channel 478, and is discharged from the outflow opening 474 and returned to the microflow channel 460. The pump 470 is driven so that the flow rate of the suspension of the organic substance discharged from the outflow opening 474 becomes larger than the flow rate of the suspension passing near the wall of the microflow channel 460. In this manner, the flow rate of the suspension passing near the wall of the microflow channel 460 can be increased.

Figure 4B:
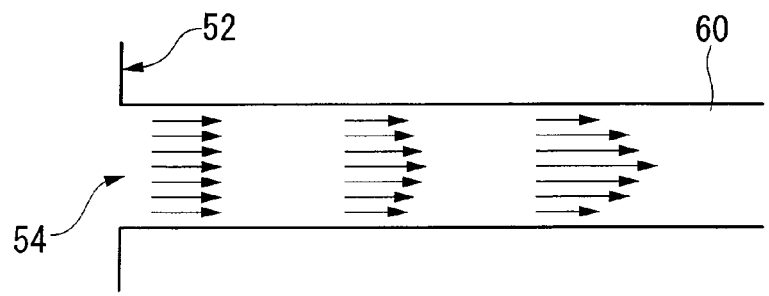
FIG. 4B is a cross-sectional view showing the flow rate distribution of the organic substance passing through the microflow channel 60.
Figure 4C:
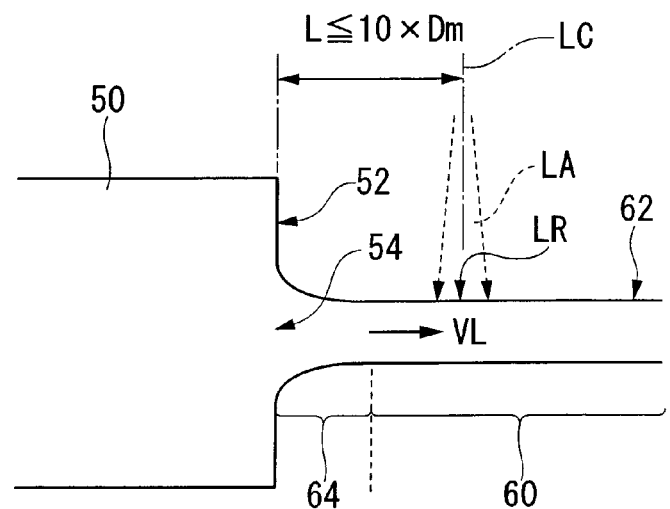
FIG. 4C is a cross-sectional view showing an embodiment in which a transition part 64 is provided between the microflow-channel introductory part 50 and the microflow channel 60.

As described above, the flow rate of the organic substance passing through the microflow channel 460 tends to exhibit a flow rate distribution such that the flow becomes slowest near the walls of the microflow channel 460 and fastest near the center line of the microflow channel 460 (see FIG. 4B). Even when such a flow rate distribution is generated, by driving the pump 470, the flow rate of the organic substance passing near the wall of the microflow channel 460 can be increased. By rendering the flow rate distribution of the organic substance passing through the microflow channel 460 substantially uniform in this manner, followed by irradiation of the laser beam within the irradiation region LR, heterogeneity in the size of the ultrafine particles of the organic substance formed can be prevented.

In the embodiment described above, one opening 476 is formed in a wall of the microflow channel 460. However, a plurality of openings may be formed, depending on the type and flow rate of the suspension of the organic substance, and the irradiation position of the laser beam, and the like.

Ninth Embodiment

Figure 12:
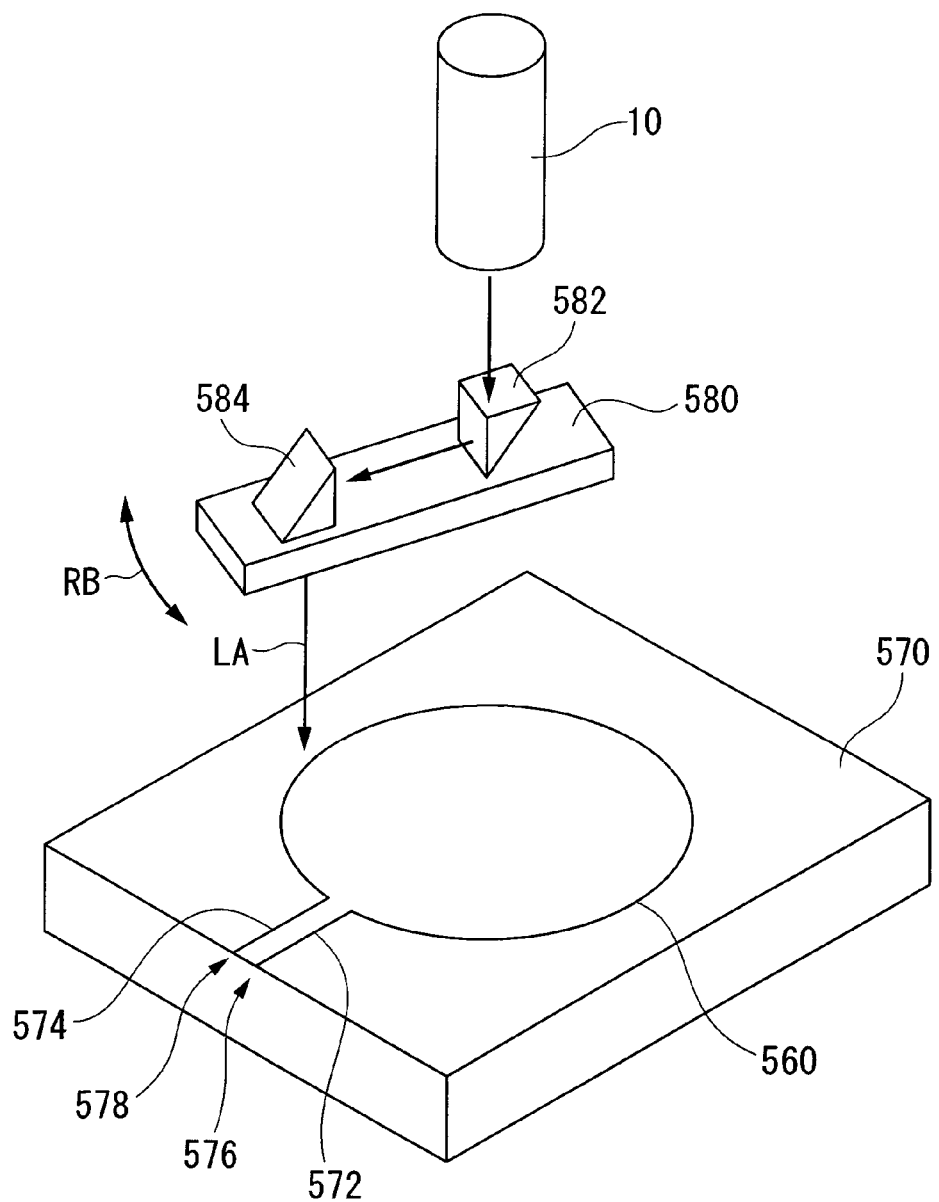
FIG. 12 is a perspective view showing an embodiment in which a suspension containing an organic substance is allowed to pass along an arc-shaped microflow channel 560, and a laser beam is irradiated along the microflow channel 560.

FIG. 12 is a perspective view showing an embodiment in which the suspension of the organic substance is allowed to pass along an arc-shaped microflow channel 560, and a laser beam is irradiated along the microflow channel 560. In the ninth embodiment, as in the first embodiment, a light source 10 (not shown) is used which generates a pulsed laser beam, i.e., a light source capable of intermittently generating a laser beam.

The microflow channel 560 has an arc shape. The shape of the cross-section taken along the plane perpendicular to the tangent of the arc of the microflow channel 560, like the microflow channel 60, is substantially square. It is preferable that the length ML of a side of this square is also 1.1 to 200 times the diameter of the organic substance. By setting the length ML of a side of the square within this range, the flow of the organic substance within the microflow channel 560 can be smoothed, so that clogging of the microflow channel 560 by the organic substance can be avoided, and the laser beam can be accurately irradiated to the organic substance. In FIG. 12, for the sake of simplicity, the microflow channel 560 is illustrated with a single solid line.

The microflow channel 560 is fixed to a base 570. A portion of the microflow channel 560 has an inflow channel 572 and an outflow channel 574 connected thereto. The inflow channel 572 has an inflow opening 576, and the outflow channel 574 has an outflow opening 578.

The inflow opening 576 has a microflow-channel introductory part 50 illustrated in FIG. 1 (not shown in FIG. 12) connected thereto, and the outflow opening 578 has a collecting part 70 illustrated in FIG. 1 (not shown in FIG. 12) connected thereto. By this configuration, the suspension of the organic substance allowed to flow through the inflow opening 576 passes through the arc-shaped microflow channel 560, and is discharged from the outflow opening 578.

An optical transmission part 580 and a light source 10 are arranged above the microflow channel 560. As described above, the light source 10, as in the first embodiment, generates a pulsed laser beam, i.e., the light source intermittently generates a laser beam.

The optical transmission part 580 is provided on a rotatable substrate (not shown). The optical transmission part is provided on the rotatable substrate in a manner such that the center of rotation of the optical transmission part 580 comes in line with the center of the arc of the microflow channel 560. The optical transmission part 580 is provided with an electric motor (not shown) for rotating the optical transmission part 580. By driving the electric motor, the optical transmission part 580 can be rotated clockwise or counter-clockwise (illustrated with the arrow RB in FIG. 12) with a predetermined revolution rate.

On the upper face of the optical transmission part 580, two prisms 582 and 584 are provided to face each other. The prism 582 is located to include the center of rotation of the optical transmission part 580. At a lower portion of the prism 584, an opening (not shown) is formed, and the laser beam can be transmitted therethrough. The prism 584 is located on the optical transmission part 580 such that the microflow channel 560 is positioned below the opening of the prism 584.

A light source 10 is arranged above the optical transmission part 580. The light source 10 is provided on a substrate (not shown) such that a laser beam generated from the light source 10 is irradiated toward the center of rotation of the optical transmission part 580.

The laser beam generated from the light source 10 is irradiated downwardly to the center of rotation of the optical transmission part 580, and enters the prism 582 from the upper face thereof. The laser beam which has entered from the upper face of the prism 582 is reflected on the inclined plane of the prism 582, and is emitted from the side face of the prism 582. The laser beam emitted from the side face of the prism 582 enters the prism 584 from the opposing side face thereof, and is reflected on the inclined plane of the prism 584 to be emitted from the lower face of the prism 584. The laser beam emitted from the lower face of the prism 584 is irradiated downwardly to the microflow channel 560 positioned below the prism 584.

In this manner, the position of the microflow channel 560 to be irradiated with the laser beam moves along the arc of the microflow channel 560, so that the organic substance passing through the microflow channel 560 can be irradiated for only a predetermined period.

The flow rate of the organic substance passing through the microflow channel 560 and the revolution rate and rotational direction of the optical transmission part 580 can be appropriately selected depending on the type and size of the organic substance, and the size of the ultrafine particles of the organic substance formed.

Further, in the embodiment described above, although two prisms are used to guide the laser beam generated from the light source 10, other optical devices such as mirrors may be used to guide the laser beam to the microflow channel 560.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

What is claimed is:

1. An apparatus for forming ultrafine particles, comprising:
a light source generating a laser beam to irradiate an organic substance to form ultrafine particles of said organic substance from said organic substance;
at least one microflow channel to pass therethrough a suspension containing said organic substance; and
a flow device to pass said suspension containing said organic substance to through said microflow channel,
said organic substance irradiated in said microflow channel with said laser beam at least once within a predetermined time period.

2. The apparatus according to claim 1, wherein
said flow device continuously passes said suspension containing said organic substance through said microflow channel,
said laser beam is a pulsed laser beam, and
said organic substance is irradiated with said pulsed laser beam at least once.

3. The apparatus according to claim 1, wherein
said organic substance is a particulate, insoluble organic drug having an average diameter of 1 to 500 µm, and
said suspension is a suspension of said particulate, insoluble organic drug in an aqueous solution, an organic solvent or an oily liquid.

4. The apparatus according to claim 1, wherein the ultrafine particles of said organic substance have an average diameter of 10 to 500 nm.

5. The apparatus according to claim 1, wherein a portion of said microflow channel which is irradiated with said laser beam is planar.

6. The apparatus according to claim 1, wherein said pulsed laser beam has an excitation light intensity of 1 to 1,000 mJ/cm$^2$.

7. The apparatus according to claim 1, wherein said pulsed laser beam has a pulse width of 10 femto seconds to 1 micro seconds.

8. The apparatus according to claim 1, wherein the liquid of said suspension is an inert or semi-inert liquid.

9. The apparatus according to claim 1, wherein a maximum diameter of a cross-section of said microflow channel is 1.1 to 200 times larger than a diameter of said organic substance.

10. The apparatus according to claim 1, wherein
a flow rate VL of said organic substance passing through said microflow channel satisfies the relation: VL<K×dL/tL, where dL represents a diameter of an irradiation region of said laser beam upon irradiation thereof, tL represents an irradiation period, and K represents a predetermined constant.

11. The apparatus according to claim 1, further comprising:
a microflow-channel introductory part communicating with said microflow channel and introducing said suspension to said microflow channel,
wherein a cross-sectional area of said microflow-channel introductory part is larger than a cross-sectional area of said microflow channel.

12. The apparatus according to claim 11, further comprising:
a transition part disposed between said microflow-channel introductory part and said microflow channel to promote a laminar and uniform flow of said organic substance,
said transition part communicating with both of said microflow-channel introductory part and said microflow channel and introducing said suspension from said microflow-channel introductory part to said microflow channel,
wherein distance from said microflow-channel introductory part to said microflow channel is not larger than 10 times an hydraulic diameter of a cross-section of said microflow channel.

13. The apparatus according to claim 1, further comprising:
a plurality of said microflow channels, said plurality of microflow channels arranged in parallel.

14. The apparatus according to claim 1, further comprising:
an agglomeration prevention unit to prevent agglomeration of said organic substance following the irradiation with said laser beam.

15. The apparatus according to claim 1, further comprising:
a cyclone separator for sorting said organic substance following the irradiation with said laser beam into ultrafine particles and particles which have not been size-reduced.

16. The apparatus according to claim 1, wherein said microflow channel is provided with a temperature-control unit for controlling the temperature of said suspension.

17. The apparatus according to claim 1, wherein said microflow channel has a hydrophobic or hydrophilic opening on an inflow end portion thereof for preventing bubbles within said suspension from flowing into said microflow channel, and
said inflow end portion is provided with a discharge channel for discharging said bubbles.

18. The apparatus according to claim 1, wherein said microflow channel has provided in a wall thereof a flow rate-increasing part for increasing the flow rate of said suspension.

19. The apparatus according to claim 1, wherein said microflow channel has an arc portion in which at least one portion thereof is in the shape of an arc and which allows said suspension to pass along the arc,
and wherein said apparatus is provided with a mobile, laser beam-irradiation unit for irradiating said laser beam along said arc portion of said microflow channel.

20. The apparatus according to claim 14, said agglomeration prevention unit including a piezoelectric transducer to apply ultrasonic waves to a collecting part of the apparatus to prevent agglomeration of said ultrafine particles.

21. The apparatus according to claim 14, said agglomeration prevention unit including a magnetically driven impeller disposed in a collecting part of the apparatus to prevent agglomeration of said ultrafine particles.

22. The apparatus according to claim 1, further comprising:
pores formed at an inflow end of said microflow channel, said pores including a hydrophilic material to prevent bubbles from passing through said pores to a branched portion of said microflow channel, said organic substance irradiated in said branched portion after passing through said pores.

23. The apparatus according to claim 22, wherein said branched portion is positioned below said inflow end of said microflow channel.

24. The apparatus according to claim 1, further comprising:
pores formed at an inflow end of said microflow channel, said pores including a hydrophobic material to attract bubbles through said pores to a branched portion of said microflow channel, said organic substance irradiated downstream said pores, after passing by said pores and said branched portion.

25. The apparatus according to claim 11, wherein a center of said laser beam irradiating said organic substance is positioned from said microflow-channel introductory part along said microflow channel at a distance not larger than 10 times an hydraulic diameter of a cross-section of said microflow channel.

\* \* \* \* \*